(12) United States Patent
Chilcote-Bacco

(10) Patent No.: US 11,244,471 B2
(45) Date of Patent: *Feb. 8, 2022

(54) METHODS AND APPARATUS TO AVOID COLLISIONS IN SHARED PHYSICAL SPACES USING UNIVERSAL MAPPING OF VIRTUAL ENVIRONMENTS

(71) Applicant: Intel Corporation, Santa Clara, CA (US)

(72) Inventor: Derek Chilcote-Bacco, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/883,857

(22) Filed: May 26, 2020

(65) Prior Publication Data
US 2020/0286253 A1    Sep. 10, 2020

Related U.S. Application Data

(63) Continuation of application No. 16/022,684, filed on Jun. 28, 2018, now Pat. No. 10,664,988.

(51) Int. Cl.
*G06T 7/70* (2017.01)
*G06T 19/00* (2011.01)
(Continued)

(52) U.S. Cl.
CPC ............ *G06T 7/70* (2017.01); *G06F 16/5854* (2019.01); *G06K 9/00214* (2013.01);
(Continued)

(58) Field of Classification Search
CPC ......... G06T 7/70; G06T 19/00; G06T 19/006; G06T 2210/21; G06F 16/5854; G06K 9/00214; G06K 9/00671
See application file for complete search history.

(56) References Cited

U.S. PATENT DOCUMENTS 9,754,167 B1 *   9/2017   Holz ................... G06K 9/00355
9,972,132 B2     5/2018   O'Connor et al.
(Continued)

FOREIGN PATENT DOCUMENTS

WO    2018200315    11/2018

OTHER PUBLICATIONS

Sun et al. :Mapping Virtual and Physical Reality, ACM Trans. Graph., vol. 35, No. 4, Article 64, Publication Date: Jul. 2016 (Year: 2016).*

(Continued)

*Primary Examiner* — Qian Yang
(74) *Attorney, Agent, or Firm* — Hanley, Flight & Zimmerman, LLC

(57) ABSTRACT

Methods, apparatus, systems, and articles of manufacture are disclosed. An example apparatus includes an index map generator to generate a first index map based on a first virtual environment generated by a first mobile device, the first mobile device associated with a first user, a collision detector to determine a collision likelihood based on the first index map, and an object placer to, in response to the collision likelihood satisfying a threshold, modify the first virtual environment.

27 Claims, 12 Drawing Sheets

(51) Int. Cl.
*G06K 9/00* (2022.01)
*G06F 16/583* (2019.01)

(52) U.S. Cl.
CPC ............ *G06T 19/00* (2013.01); *G06T 19/006* (2013.01); *G06K 9/00671* (2013.01); *G06T 2210/21* (2013.01)

(56) References Cited

U.S. PATENT DOCUMENTS

| | | | |
|---|---|---|---|
| 9,984,506 | B2 | 5/2018 | Miller |
| 10,664,988 | B2 | 5/2020 | Chilcote-Bacco |
| 2008/0231631 | A1 | 9/2008 | Matsumura et al. |
| 2009/0125590 | A1 | 5/2009 | Hayano et al. |
| 2013/0286004 | A1* | 10/2013 | McCulloch ........... G06T 19/006 345/419 |
| 2016/0379591 | A1 | 12/2016 | Oya |
| 2018/0276891 | A1* | 9/2018 | Craner ................... G06T 19/20 |
| 2018/0374236 | A1 | 12/2018 | Ogata et al. |
| 2019/0043214 | A1 | 2/2019 | Chilcote-bacco |
| 2019/0371024 | A1* | 12/2019 | Wisely Babu ........ G06T 19/006 |
| 2021/0240256 | A1* | 8/2021 | Lai .......................... G08B 7/06 |

OTHER PUBLICATIONS

Hodgson et al. "Redirected Walking to Explore Virtual Environments: Assessing the Potential for Spatial Interference", ACM Transactions on Applied Perception, vol. 8, No. 4, Article 22, Publication date: Nov. 2011. (Year: 2011).*

Glencross et al., "Interaction Distributed Virtual Environments," Eurographics, Tutorial, 2005, 120 pages.

Sra et al. "Oasis: Procedurally Generated Social Virtual Spaces from 3D Scanned Real Spaces," IEEE Transactions on Visualization and Computer Graphics 2017, 14 pages.

United States Patent and Trademark Office, "Notice of Allowance," dated Jan. 21, 2020 in connection with U.S. Appl. No. 16/022,684, 9 pages.

* cited by examiner

METHODS AND APPARATUS TO AVOID COLLISIONS IN SHARED PHYSICAL SPACES USING UNIVERSAL MAPPING OF VIRTUAL ENVIRONMENTS

RELATED APPLICATION

This patent arises from a continuation of U.S. patent application Ser. No. 16/022,684, filed on Jun. 28, 2018, granted as U.S. Pat. No. 10,664,988 and entitled "METHODS AND APPARATUS TO AVOID COLLISIONS IN SHARED PHYSICAL SPACES USING UNIVERSAL MAPPING OF VIRTUAL ENVIRONMENTS," which is hereby incorporated by reference in its entirety.

FIELD OF THE DISCLOSURE

This disclosure relates generally to universal mapping of different virtual environments and, more particularly, to methods and apparatuses to avoid collisions in shared physical spaces using universal mapping of virtual environments.

BACKGROUND

In recent years, virtual reality (VR) and augmented reality (AR) technologies have become increasingly common. Currently, VR and AR technologies commonly use headsets to immerse users in generated virtual environments. In some examples, these headsets simulate images, sounds and/or physical sensations (e.g., vibrations) that replace and/or augment a user's perception of their physical environment. In some examples, virtual environments allow users to sense (e.g., see, feel, etc.) and/or interact with virtual objects. Increasingly, VR and AR technology applications are being operated on mobile devices, such as smart phones and portable gaming devices.

One application of VR and AR technologies is gaming. VR and AR technology allows users to immerse themselves in interactive environments to compete in single-player or multiplayer games. Recent popularity of virtual environment games, such as Pokemon Go®, show that VR and/or AR technology has a great potential to change how users interact with the physical world and each other.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
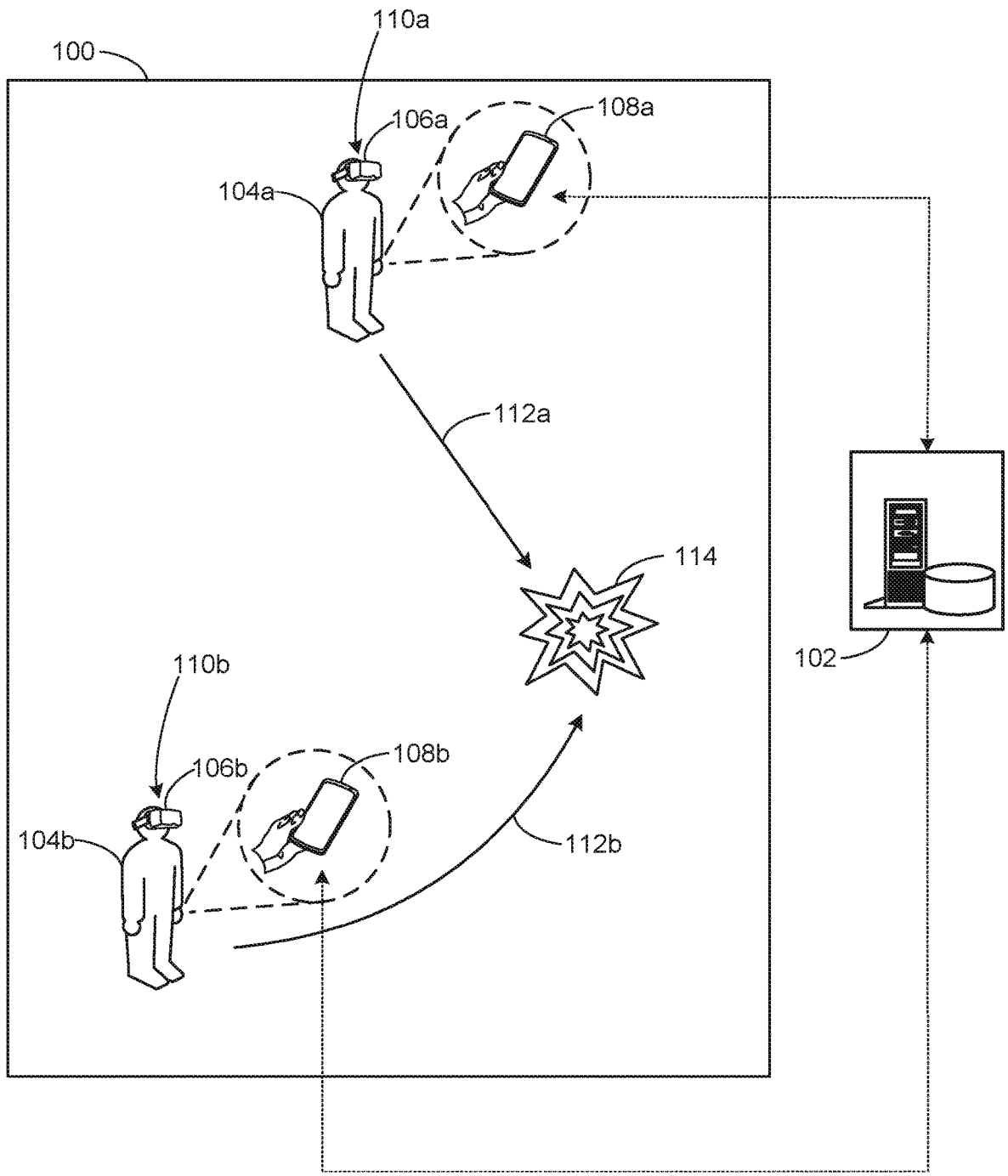
FIG. 1 is an illustration of an example physical space where the teaching disclosed herein may be implemented.

As used herein, a "virtual environment" is a computer-generated scenario that modifies or replaces some of a person's perceptions of their surrounding physical environment. In some examples, a virtual environment may include virtual objects and/or information overlaid on a person's normal perception of their surroundings (e.g., an AR). In other examples, a virtual environment may entirely replace a person's normal vision, hearing, olfactory and/or haptic perceptions (a VR). As used herein, "different virtual environments," refer to virtual environments experienced by different users. In some examples, different virtual environments may be generated by the same application and transmitted to different users.

As used herein, "virtual objects" are objects that are created in a virtual reality that can be perceived by a user. In some examples, virtual objects may be stationary. In other examples, virtual objects may be mobile. In some examples, virtual objects may include non-player characters (NPCs) or other scenario specific objects. Additionally or alternatively, virtual objects may include sounds, smells, haptic feedback and/or perceivable information.

In recent years, AR and VR applications have become more common on mobile devices. This commonality may result in multiple users, in the same or different virtual environments, sharing the same physical spaces. When multiple people are experiencing virtual environments in the same physical space, the potential of a physical collision between users is increased. For example, users may not be able to predict the movements of other users because they cannot perceive what the other users perceive. In some examples, users may make quick unexpected movements due to the presence of virtual object in their respective virtual environments. In other examples, when a user's perception is completed replaced by a virtual environment, user's may not be able perceive other users at all. Collisions between users may cause injuries for one or both people, damage to the physical space and/or damage to VR/AR equipment.

Examples are disclosed herein to avoid collisions between users in different virtual environments in shared physical spaces. An example system disclosed herein includes a first mobile device, associated with a first user, generating a first virtual environment, a second mobile device, associated with a second user generating a second virtual environment and a server. The example server includes an index map generator to generate a first index map for the first virtual environment and a second index map for the second virtual environment. The example server also includes a collision detector to determine a collision likelihood based on a comparison of the first index map and the second index map. The example server also includes an object placer to, in response to the collision likelihood satisfying a threshold, modify at least one of the first virtual environment or the second virtual environment. For example, the object placer may place repulsive objects (e.g., an enemy, a trap, etc.) in at least one of the virtual environment to deter users from moving towards areas of the physical space where the collision likelihood satisfies the threshold.

An example apparatus disclosed herein includes an index map generator to communicate with a first game application, the game application generating a virtual environment; and generate a first index map based on the location of a set of virtual objects in the virtual environment. The example apparatus further includes a transceiver to receive a second index map from a remote mobile device, a collision detector to determine a collision likelihood based on a comparison of the first index map and the second index map and an object placer to, if the collision likelihood satisfies a threshold, modify the virtual environment.

FIG. 1 is an illustration of an example physical space 100 where the teaching disclosed herein may be implemented. The example physical space includes an example server 102. The physical space 100 further includes an example first user 104a, with an example first headset 106a and an example first mobile device 108a, and an example second user 104b, with an example second headset 106b and an example second mobile device 108b, are experiencing an example first virtual environment 110a and an example second virtual environment 110b, respectively. In the illustrated example, the example first user 104a, due to information (e.g., virtual objects, etc.) generated by the first virtual environment 110a and presented to them by the headset 106a, is moving on an example path 112a. The second user 104b is moving in on an example path 112b, due to information (e.g., virtual objects, etc.) generated by the second virtual environment 110b and presented to them by the headset 106b. In the illustrated example, these converging movement directions cause a potential collision 114.

In the illustrated example of FIG. 1, the physical space 100 is a space (e.g., a room, an outdoor space, etc.) that allows people to play VR/AR games and contains no notable physical objects and/or obstacles. Alternatively, the physical space 100 may contain physical obstacles (e.g., a desk, a rock, etc.). The example server 102 communicates with the first mobile device 108a and second mobile device 108b such they modify one or both of the first virtual environment 110a and the second virtual environment 110b to account for the physical obstacles. In other examples, cameras and/or other sensors may detect physical obstacles.

In the illustrated example, the server 102 is a computer device or program capable of interfacing with the mobile devices 108a, 108b. In some examples, the server 102 may be absent and the mobile devices 108a, 108b may communicate directly with each other. In some examples, the server 102 is physically located in the physical space 100. In other examples, the server 102 is remote to the physical space 100 and is able to remotely interface with electronic devices in the physical space 100. In some examples, the example server 102 receives information about the first virtual environment 110a and the second virtual environment 110b from the first mobile device 108a and the second mobile device 108b, respectively. In some examples, the server 102 transmits information to the one or both mobile devices 108a, 108b to update the first virtual environment 110a and second virtual environment 110b. An example implementation of the server 102 is described below in conjunction with FIG. 2.

In the illustrated example, the mobile devices 108a, 108b are smartphones. Alternatively, the mobile devices 108a, 108b may be any mobile device capable of generating a virtual environment and communicating with external devices (e.g., a portable gaming system, a laptop computer, a smartwatch, etc.). Alternatively, the mobile devices 108a, 108b may be integrated into the first headset 106a and second headset 106b, respectively. In this example, the first headset 106a and second headset 106b may be communicating with the server 102 to generate the virtual environments 110a, 110b. Additionally or alternatively, the first headset 106a and second headset 106b may be communicating with separate stationary devices to generate the first virtual environment 110a and second virtual environment 110b, respectively. In some examples, the mobile device 108a, 108b may be absent and the virtual environments 110a, 110b may be generated by the server 102.

In the illustrated example, the first headset 106a presents the first virtual environment 110a to the first user 104a and the second headset 106b presents the second virtual environment 110b to the second user 104b. The headsets 106a, 106b may be a head-mounted stereoscopic device (e.g., an Oculus Rift, a HTC Vive, a Google Daydream, a Samsung Gear, etc.), an optical head-mounted display (e.g., smartglasses, Google Glass, Intel Vaunt Glasses, etc.), a virtual retinal display, bionic contact lens, a heads-up display, etc. In some examples, the headsets 106a, 106b may also additionally provide olfactory and/or audio sensor inputs to the users 104a, 104b. In some examples, the headsets 106a, 106b may also provide haptic feedback. In some examples, the headsets 106a 106b may include head motion tracking sensors and/or eye tracking sensors. In some examples, the headsets 106a, 106b are absent and the virtual environments 110a, 110b may be presented to the users 104a, 104b by another suitable device (e.g., the visual interface of the mobile devices 108a, 108b, etc.).

The virtual environments 110a, 110b are computer generated scenarios that are perceived by the users 104a, 104b, respectively. In the illustrated example, the virtual environments 110a, 110b are generated for the users 104a, 104b for gaming. Alternatively, the virtual environments 110a, 110b may be for other entertainment applications (three-dimensional (3d) cinema, attending a remote event, etc.), remotely controlling a robot, training (military simulation, medical simulation, etc.), therapy, etc. In the illustrated example, the virtual environments 110a 110b are different virtual environments that include different virtual objects and/or locations. For example, the first virtual environment 110a and second virtual environment 110b may be two different gaming environments. In some examples, the virtual environments 110a, 110b may be separate instances of the same gaming application. In some examples, the virtual environments 110a 110b may be generated by the server 102. In some examples, virtual objects in the virtual environments 110a 110b (e.g., virtual objects) have corresponding locations in the physical space 100. In some examples, the virtual environments 110a, 110b may different instances of the same virtual environment with the same virtual objects and/or locations. In other examples, the virtual environments 110a, 110b may different instances of the same virtual environment with different virtual objects and/or locations.

In operation, the first mobile device 108a and the second mobile device 108b transmit information (e.g., the index map 812 of FIG. 8) to the server 102. In some examples, the server 102 analyzes the transmitted information to determine the likelihood of a collision between the first user 104a and the second user 104b and potential location in the physical space 100 of the collision. In some examples, the server 102 transmits information to the mobile devices 108a, 108b that allows one or both of the virtual environments 110a, 110b to be modified to reduce the overall likelihood of collision between the first user 104a and the second user 104b. An example of this operation is described below in conjunction with FIGS. 3-5. Alternatively, if the server 102 is absent, the mobile devices 108a, 108b may communicate with directly with one another. An example of this operation is described below in conjunction with FIG. 6.

Figure 2:
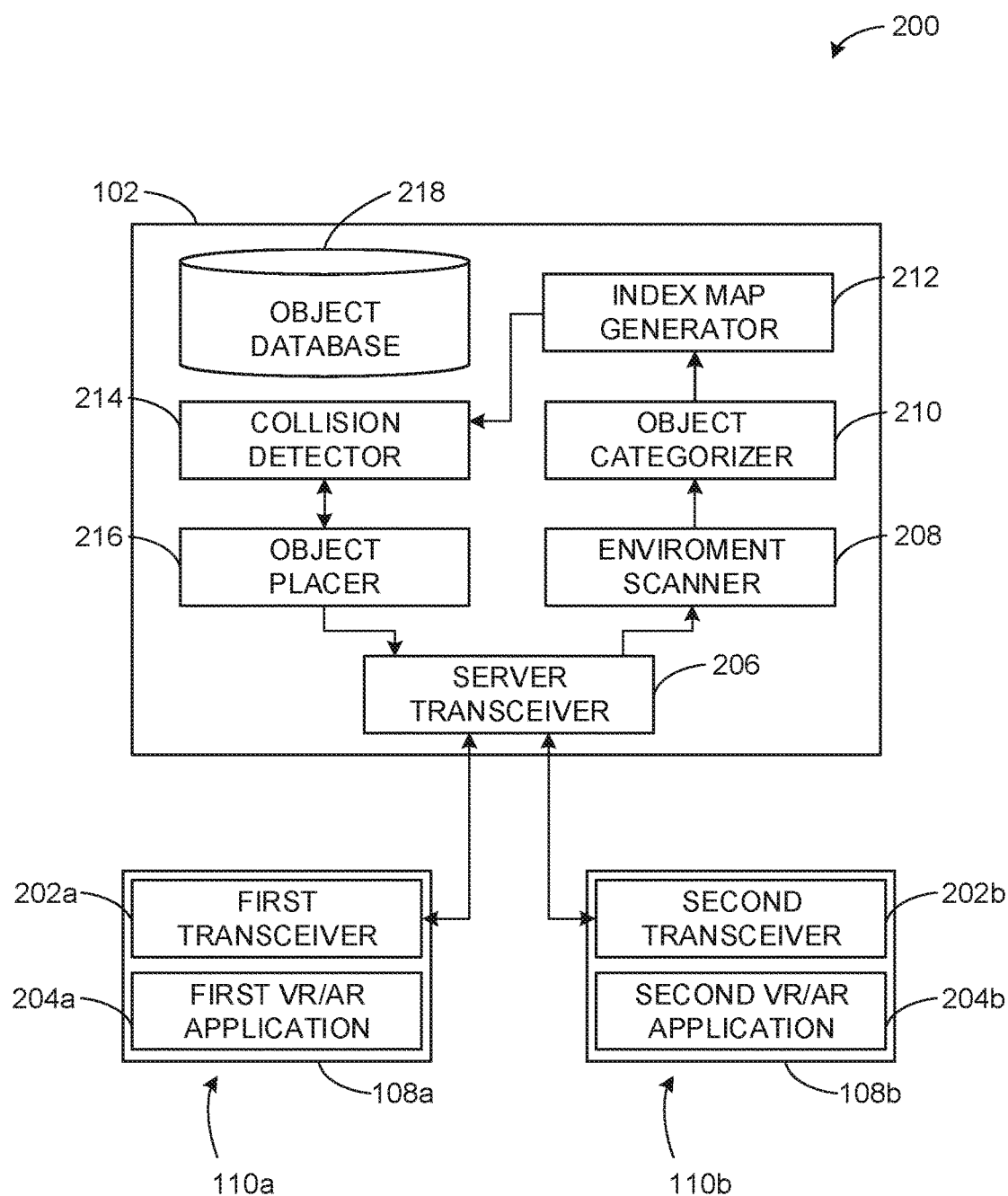
FIG. 2 is a block diagram of an example server implemented in accordance to teachings of this disclosure.

FIG. 2 is a block diagram of the server 102. A block diagram of a system 200 that includes a block diagram of an example implementation of the server 102 of FIG. 1 implemented using the teachings of this disclosure. The example server 102 includes an example server transceiver 206, an example environment scanner 208, an example object categorizer 210, an example index map generator 212, an example collision detector 214, an example object placer 216 and an example game object database 218. The example server 102 interfaces with the example first mobile device 108a and the example second mobile device 108b via the server transceiver 206. The example first mobile device 108a includes an example first transceiver 202a and an example first VR/AR application 204a. The second example mobile device 110b includes an example second transceiver 202b and an example second VR/AR application 204b. In some examples, the first mobile device 108a and the second mobile device 108b communicate with the server 102 via the first transceiver 202a and the second transceiver 202b, respectively.

In the illustrated example, the first VR/AR application 204a and the second VR/AR application 204b generate virtual environments for the first mobile device 108a and the second mobile device 108b, respectively. In some examples, the first VR/AR application 204a and the second VR/AR application 204b are different applications (e.g., the first VR/AR application is an action video game and the second VR/AR application is a horror video game, etc.). In some examples, the VR/AR applications 204a, 204b may be different instances of the same application (i.e., two separate instances of an AR training simulation). In other examples, one or both of the VR/AR applications 204a, 204b may be partly or entirely stored on or contained within the server 102. In the illustrated example, the information associated with the virtual environments 110a, 110b generated by one or both of the VR/AR applications 204a, 204b is transmitted to the mobile devices 108a, 108b via the server transceiver 206. In some examples, a database of what types of objects can be generated by the VR/AR applications 204a, 204b is stored in the object database 218.

The example server transceiver 206 receives information about the virtual environments generated by the VR/AR applications 204a, 204b (e.g., the virtual environments 110a, 110b) transmitted by the first transceiver 202a, 202b, respectively. For example, the mobile devices 108a, 108b transmit the virtual environments 110a, 110b to the server 102. In other examples, the mobile devices 108a, 108b may instead transmit a simplified map (e.g., an index map) of the virtual environments 110a, 110b to the server 102. In this example, the mobile devices 108a 108b transmits a universal virtual objection location index (UVOLI). For example, an UVOLI may include the corresponding physical location of virtual objects in the virtual environments 110a, 110b, a categorization of those virtual objects and/or property of those objects. In other examples, the generation of an UVOLI may instead be performed on the server 102 from the transmitted virtual environments 110a, 110b (e.g., by the environmental scanner 208, the object categorizer 210, and index map generator 212). Additionally, the mobile devices 108a, 108b may also transmit the physical location (e.g., GPS data, beacon triangulation data, etc.) of the mobile devices 108a, 108b and/or users 104a, 104b.

The example environment scanner 208 scans for virtual objects in the virtual environments 110a, 110b and determines the corresponding physical locations of those virtual objects in the physical space 100. For example, the environment scanner 208 may use GPS data from the mobile devices 108a, 108b to determine the location of the users 104a 104b. In some example, since the physical location of the users 104a 104b and the position of virtual objects relative to them are known, the corresponding physical locations of virtual objects may be determined. Alternatively, the mobile devices 108a, 108b may determine the location of the users 104a, 104b using environment beacons (e.g., triangulation, trilateration, etc.), integrated sensors (e.g., cameras, motion sensors, etc.) and/or any other suitable means of determining physical location. Additionally or alternatively, the example environment scanner 208 may use any other suitable means to determine the location of the users 104a, 104b and/or mobile devices 108a, 108b (e.g., Wi-fi positioning, sensors in the physical space 100, RFID localization, etc.). In other examples, where determining the corresponding physical locations of virtual objects is unneeded (e.g., the virtual environments 110a, 110b has already been mapped by the mobile devices 108a, 108b to the physical space 100), the environment scanner 208 determines where virtual objects are in the virtual environment 110a, 110b.

The example object categorizer 210 receives the identified virtual objects (e.g., those identified by the environment scanner 208) and categorizes them. For example, the example object categorizer 210 categorizes each virtual object as a "repulsive object," an "attractive object" or a "neutral object." In this example, "repulsive objects" are virtual objects that are likely to cause a user (e.g., the users 104a, 104b) to move away from the repulsive objects (e.g., an enemy in a video game or training simulation, a harmful substance, etc.). Similarly, attractive objects are virtual objects that are likely to cause a user to move towards them (e.g., a power-up in a video game, the end goal of a training simulation, a friendly character, etc.). Neutral objects are virtual objects that neither likely attract nor likely repulse a user (e.g., the users 104a, 104b) but discourage the user from occupying the corresponding physical space of their location in the virtual environment (e.g., a virtual rock, a virtual tree, a wall, etc.). Alternatively, any other suitable categorization system may be used by the object categorizer 210. The example object categorizer 210 interfaces with the game object database 218 to categorize virtual objects. In this example, the object categorizer 210 uses the information stored in the object database about each identified virtual object to categorize it. Alternatively, the object categorizer may use any suitable means to categorize the identified objects (e.g., an artificial intelligence, querying the user/server administrator, etc.).

The example index map generator 212 uses categorized objects to generate a UVOLI for each input virtual environment 110a 110b. Additional detail in the function of the index map generator 212 is provided below in conjunction with FIG. 8. In the illustrated example, the UVOLI is a matrix which correlates the virtual location of each categorized virtual object to a physical location in the physical space 100. In this example, each index of the UVOLI matrix represents a location of the physical space and the scalar value of each index represents the categorization of the virtual object at that location. Additionally or alternatively, the value of each index may be a vector containing additional data relating to the particular virtual object in that location (e.g., velocity, momentum, size, application-specific data, etc.). In some examples, the location of the user is also included in the generated UVOLI.

The example collision detector 214 compares UVOLI for different virtual environments (e.g., the virtual environments 110a, 110b) and the same physical space (e.g., the physical space 100) to determine the likelihood of collision between users experiencing those virtual environments 110a, 110b. For example, the collision detector 214 may include a machine learning algorithm which receives two or more UVOLI and outputs a likelihood of collision. Alternatively, the collision detector 214 may use standard collision detection algorithms to determine the likelihood of collision between two or more users (e.g., the users 104a, 104b). Alternatively, any suitable means of determining the likelihood of collision between two or more users from the input UVOLIs may be used. In some examples, the collision likelihood may be a single scalar value. In other examples, the collision likelihood may be a matrix of values corresponding the likelihood of collision between users in each location of the physical space 100 represented in the input UVOLIs. In some examples, the collision detector 214 may compare the determined collision likelihood with a threshold. Additionally or alternatively, the collision detector 214 may determine the collision likelihood based on a comparison the position and/or movement of the users 104a, 104b and/or the paths 112a, 112b.

The example object placer 216 places virtual objects in the virtual environments 110a, 110b. In some examples, the object placer 216 modifies the UVOLIs corresponding to the virtual environments 110a, 110b to simulate the placement, movement or removal of virtual objects (e.g., modifying the values of the indexes of the UVOLI). In some examples, if the collision detector 214 determines the likelihood of collision satisfies a threshold, the object placer 216 may place, move, and/or remove virtual objects (e.g., modify a UVOLI) to reduce the likelihood of collisions between users in the same physical space. In other examples, the object placer 216 communicates with one or both VR/AR applications 204a, 204b to place or remove virtual objects in the virtual environments 110a, 110b, respectively.

While an example manner of implementing the server 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example server transceiver 206, the example environment scanner 208, the example object categorizer 210, the example index map generator 212, the example collision detector 214, the example object placer 216, the example game object database 218 and/or, more generally, the example server 102 of FIG. 2 may be implemented by hardware, software, firmware, and/or any combination of hardware, software, and/or firmware. Thus, for example, any of the example server transceiver 206, the example environment scanner 208, the example object categorizer 210, the example index map generator 212, the example collision detector 214, the example object placer 216, the example game object database 218 and/or, more generally, the example server 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example server transceiver 206, the example environment scanner 208, the example object categorizer 210, the example index map generator 212, the example collision detector 214, the example object placer 216, and the example game object database 218 is/are hereby expressly defined to include a non-transitory computer readable storage device or storage disk such as a memory, a digital versatile disk (DVD), a compact disk (CD), a Blu-ray disk, etc., including the software and/or firmware. Further still, the example server 102 of FIG. 1 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
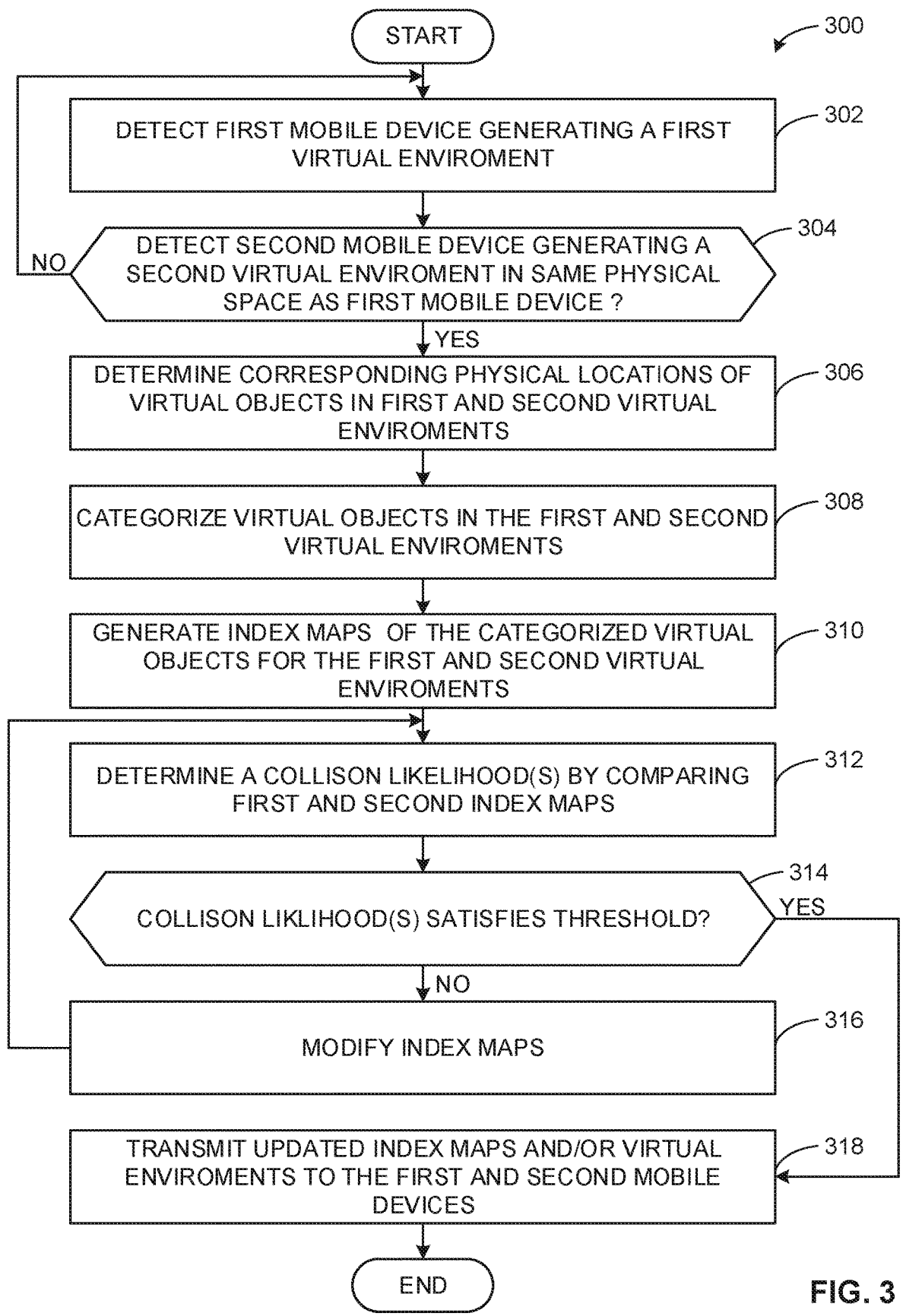
FIG. 3 is a flowchart representative of example machine readable instructions which may be executed to implement the server of FIG. 2.
Figure 4:
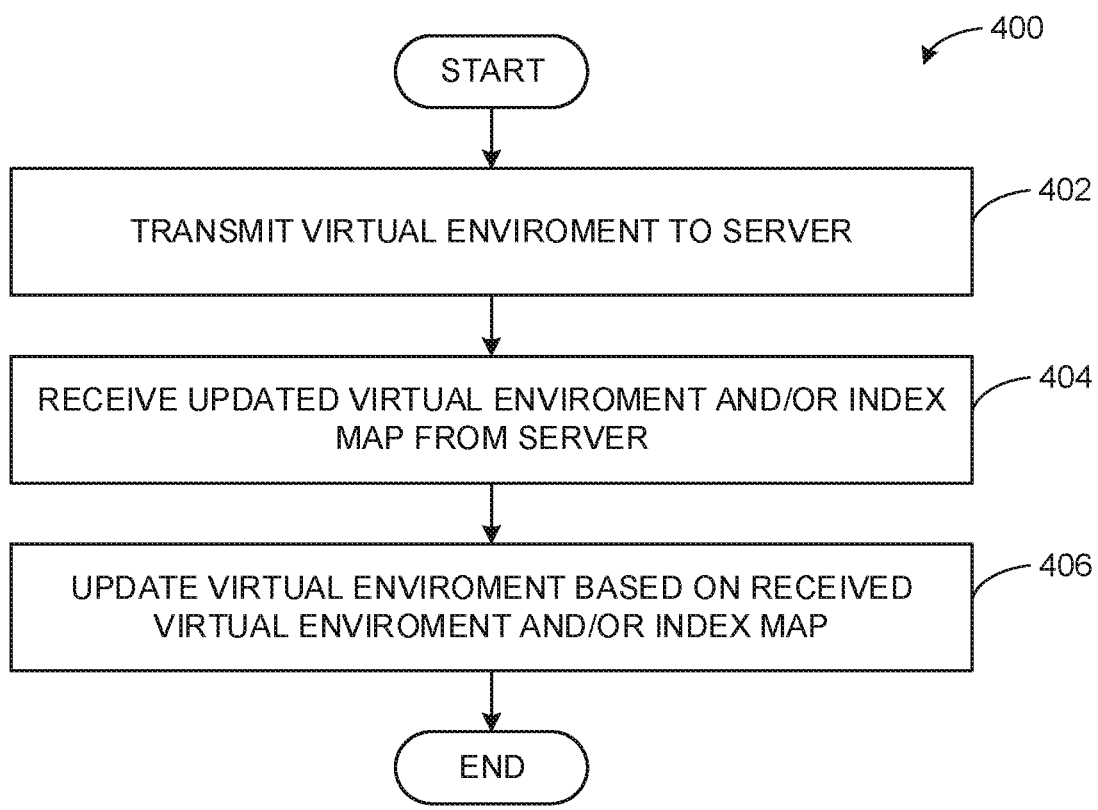
FIG. 4 is a flowchart representative of example machine readable instructions which may be executed to implement the mobile device of FIG. 2.

Flowcharts representative of example hardware logic or machine-readable instructions for implementing the server 102 of FIG. 2 and the mobile devices 108a, 108b are shown in FIGS. 3 and 4, respectively. The machine-readable instructions may be a program or portion of a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 3 and 4, many other methods of implementing the example server 102 and/or mobile devices 108a 108b may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The process 300 of FIG. 3 begins at block 302. At block 302, the server transceiver 206 detects a first mobile device 108a generating a first virtual environment 110a. For example, the server transceiver 206 may look for mobile devices (e.g., the mobile device 108a) over a Wi-Fi network, a Bluetooth network, a near-field network, and/or a cellular network (e.g., 3G, 4G, 5G, etc.). Additionally, any other suitable means of establishing communication between the server 102 and the mobile device 108a may be used. The process 300 then advances to block 304. At block 304, the server transceiver 206 determines if a second mobile device (e.g., the mobile device 108b) is generating a second virtual environment 110b in the same physical space 100 as the first media device. For example, the server transceiver 206 may use the same means to establish communication with the second mobile device 108b. Alternatively, any suitable means of detecting the presence of a second mobile device 108b may be used. If the second mobile device 108b is detected, the process 300 advances to block 306. If the second mobile device 108b is not detected, the process 300 returns to block 302 and waits for two or more mobile devices to be detected.

At block 306, the environmental scanner 208 determines the corresponding location in the physical space 100 of virtual objects in the first and second virtual environments 110a, 110b. For example, the environment scanner 208 may use GPS data from the mobile devices 108a 108b to determine the location of the users 104a 104b. In this example, since the physical location of the users 104a, 104b and the position of virtual objects in the virtual environments 110a, 110b relative to the users 104a, 104b are known, the corresponding physical locations of virtual objects may be determined by the environmental scanner 208. In other examples, the environment scanner 208 may use environmental beacons to determine the location of the users 104a 104b (e.g., using triangulation, trilateration, etc.) Alternatively, the environment scanner 208 may use any other suitable means for determining the corresponding physical locations in the physical space 100 of objects in the virtual environments 110a,110b including, for example, Wi-Fi positioning, sensors in the physical space 100, sensors on the mobile devices 108a 108b, RFID localization, etc. In some examples, the corresponding physical locations in the physical space 100 of virtual objects is already known and the environment scanner 208 merely collects this data. Once the corresponding location in the physical space 100 of the virtual objects in the first and second virtual environments 110a, 110b is known, the process 300 advances to block 308.

At block 308, the object categorizer 210 categorizes virtual objects in the first and second virtual environments 110a, 110b. For example, the object categorizer 210 may categorize the virtual objects as attractive objects, repulsive objects and/or neutral objects. In other examples, the object categorizer 210 may be any other suitable categorization scheme to categorize the virtual objects. In some examples, the object categorizer 210 uses a database of objects associated with the virtual environments 110a, 110b to categorize the objects (e.g., the object database 218 of FIG. 2). In other examples, the object categorizer uses a different suitable method to categorize the virtual objects (e.g., a machine learning algorithm, etc.). Once the virtual objects have been categorized, the process 300 then advances to block 310.

At block 310, the index map generator 212 generates index maps of the categorized virtual objects for the first and second virtual environments 110a, 110b. For example, the index map generator 212 may generate a UVOLI for each of the virtual environments 110a, 110b. In some examples, the index map generator 212 generates a UVOLI which includes a matrix containing values indicating the categorization of each of the virtual environments 110a,110b. Additionally or alternatively, the value(s) of each index of the UVOLI may be a vector containing additional information about each virtual object (e.g., velocity, momentum, size, application-specific data, etc.). An example implementation of the index map generator 212 is discussed below in connection with FIG. 8. Once the index map generator 212 has generated a UVOLI, the process 300 advances to block 312.

At block 312, the collision detector 214 determines a collision likelihood(s) by comparing first and second index maps. For example, the collision detector 214 may compare generated UVOLIs to determine a likelihood of collision between the users 104a, 104b in the virtual environment 110a, 110b. In some examples, the collision likelihood may be a single scalar value. Alternatively, the collision likelihood may be a matrix of the same the size as the input UVOLIs. In some examples, the collision likelihood(s) is/are represented as percentages. In other examples, the collision likelihood(s) is/are numerical values. The process 300 advances to block 314.

At block 314, the collision detector 214 determines if the collision likelihood(s) satisfies a threshold. For example, if the collision likelihood is a single scalar value, the collision detector 214 may compare the determined the calculated collision likelihood to a threshold. Alternatively, if the collision likelihood(s) is a matrix of values, the collision detector 214 may determine if any value of the collision likelihood does not satisfy the threshold. In some examples, the threshold corresponds to a maximum allowable safe collision threshold. If the collision likelihood(s) satisfies the threshold, the process 300 advances to block 318. If the collision likelihood(s) does not satisfies the threshold, the process 300 advances to block 316.

At block 316, the object placer 216 modifies the index maps associated with the first and second virtual environments 110a, 110b. For example, the object placer 216 can place objects in the first virtual environment 110a and/or the second virtual environments 110b in such way to lower the collision likelihood. Additionally or alternatively, the object placer 216 may remove and/or move objects in the first virtual environment 110a and/or second virtual environment 110b in such way to lower the collision likelihood. For example, the object placer 216 may remove a repulsive object in the first virtual environment 110a to incentivize the first user 104a to move alter their movement from the path 112b. In some examples, the object placer 216 may use a machine-learning trained algorithm(s) to modify the index maps. Alternatively, the object placer 216 may user any suitable means to modify the virtual objects. Once, the UVOLIs have been modified, the process 300 returns to block 312. In some examples, the process 300 will continue to iterate through block 312, block 314 and block 316 until the collision likelihood (as determined in block 312) satisfies the threshold (e.g., has been lowered to a safe level). In some examples, the AR/VR applications 204a, 204b regenerates the virtual environments 110a, 110b using the modified UVOLIs. In this example, the modified UVOLIs cause virtual objects to be created in and/or removed from the virtual environments.

At block 318, the server transceiver 206 transmits updated index maps and/or virtual environments (e.g., the modified virtual environments 110c,110d of FIG. 5) to first and second mobile devices 108a, 108b. For example, the server transceiver 206 may use any suitable means (e.g., Wi-Fi, near-field communication, Bluetooth, and/or a cellular network) to transmit the updated index maps and/or virtual environments to the mobile devices 108a 108b. In other examples, the AR/VR applications 204a, 204b may interface with software operating on the server 102 via an application programming interface (API). The process 300 then ends.

The process 400 of FIG. 4 may be used to implement the mobile device 108a and/or the mobile device 108b and begins at block 402. In the illustrated example, the mobile device 108a is used as reference but in other examples, the process 400 may also be performed by the mobile device 108b. At block 402, the first transceiver 202a transmits the virtual environment 110a to the server 102. For example, communication may be established between the first transceiver 202a and the server transceiver 206 using Wi-Fi, Bluetooth, near-field communication and/or a cellular communication network. Additionally or alternatively, the first transceiver 202a and the server transceiver 206 may communicate using any other suitable means. In some examples, the virtual environment 110a may be transmitted as a UVOLI. In other examples, the virtual environment 110a may be transmitted as a image, a video or any other suitable means. The process 400 then advances to block 404. At block 404, the first transceiver 202a receives an updated virtual environment (e.g., the modified virtual environment 110c of FIG. 5) and/or index map (e.g., a UVOLI) from server 102. In some examples, the updated index map and/or virtual environment may be transmitted using Wi-Fi, Bluetooth, near-field communication or a cellular network. The process 400 then advances to block 406.

At block 406, the first VR/AR application 204a updates the virtual environment 110a based on the received virtual environment (e.g., the modified virtual environment 110c of FIG. 5) and/or index map. For example, the first VR/AR application 204a may place or remove virtual objects based upon the updated virtual environment and/or UVOLI. In some examples, the VR/AR application 204a may determine a suitable virtual object based on a value in the UVOLI (e.g., the object categorization). For example, if the VR/AR application 204a is a horror video game and the update UVOLI indicates a repulsive object is to be placed in a specific location in the virtual environment 110a (e.g., which corresponds to a location in the physical space 100), the VR/AR application 204a may place an enemy ghost or zombie. Once the VR/AR application has updated the virtual environment, the process 400 ends.

Figure 5:
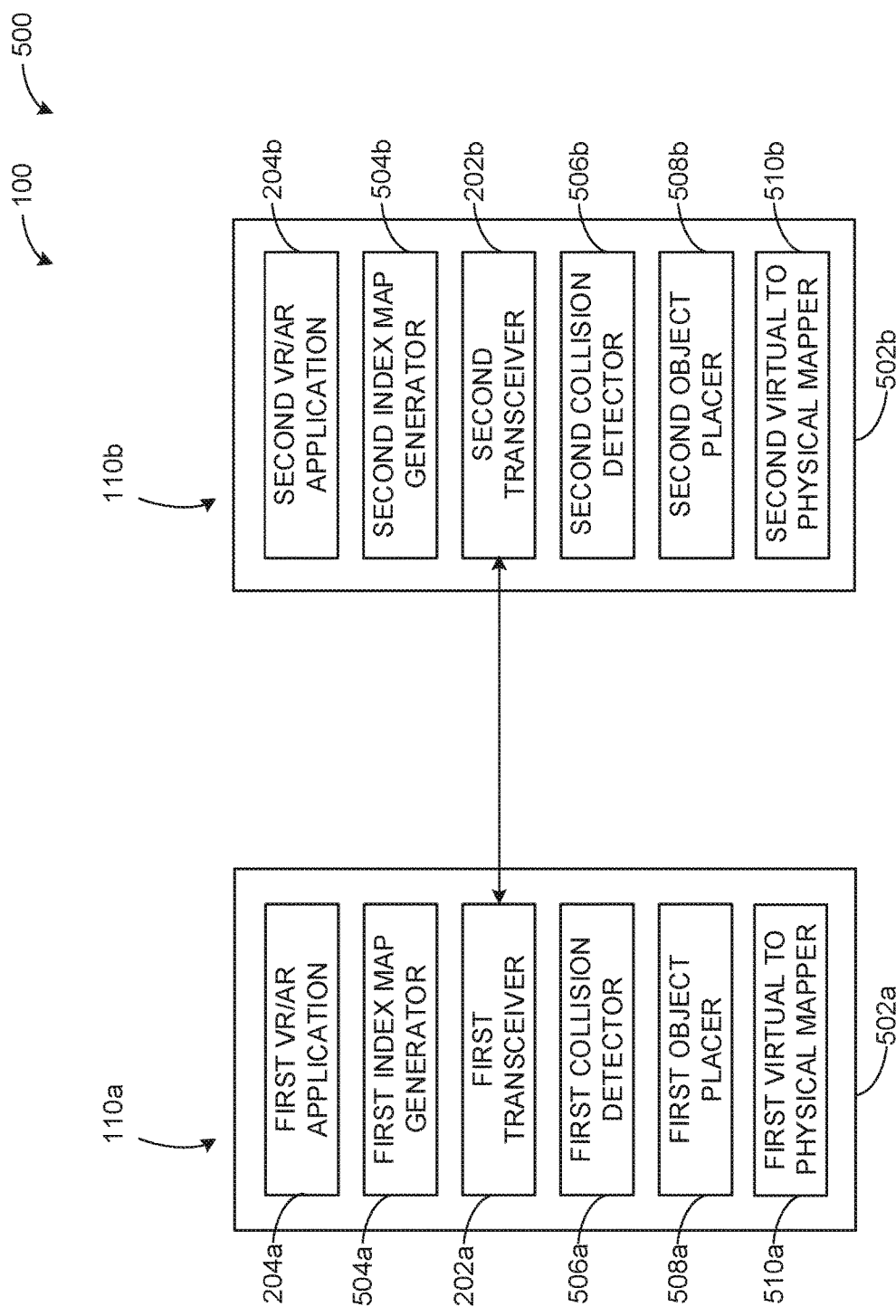
FIG. 5 is a block diagram of an example peer-to-peer communication system implemented in accordance with the teachings of this disclosure.

FIG. 5 is a block diagram of an example peer-to-peer communication system 500 implemented in accordance with the teachings of this disclosure. In the illustrated example, the peer-to-peer communication system 500 includes a server (e.g., the server 102 of FIG. 1) associated with the physical space 100. In the illustrated example, a first peer-to-peer enabled mobile device 502a communicates directly with a second peer-to-peer enabled mobile device 502b. The example first mobile device 502a includes the example first VR/AR application 204a, an example first index map generator 504a, the example first transceiver 202a, an example first collision detector 506a, an example first object placed 508a and an example first virtual to physical mapper 510a. The example second mobile device 502b includes the example second VR/AR application 204b, an example second index map generator 504b, the example second transceiver 202b, an example second collision detector 506b, an example first object placed 508b and an example first virtual to physical mapper 510b. The first example VR/AR application 204a generates the example first virtual environment 110a for the user (e.g., the user 104a of FIG. 1) of the first example mobile device 502a. The second example VR/AR application 204b generates the example virtual environment 110b for the user (e.g., the user 104b of FIG. 1) of the second mobile device 502b. In the illustrated example, the first mobile device 502a and second mobile device 502b communicate with each using the first transceiver 202a and the second transceiver 202b. In some examples, the mobile devices 502a, 502b communicate over a cellular network (e.g., 4G, 5G, etc.), a Wi-Fi network, Bluetooth and/or near-field communication. In some examples, the mobile devices 502a, 502b may be implementations of the mobile devices 108a, 108b, respectively.

The index map generators 504a 504b generates a UVOILI for the virtual environments 110a 110b generated on the mobile devices 502a 502b. The index map generators 504a, 504 maps virtual objects in virtual environments to the physical space 100. In some examples, in the system 500, one or both VR/AR applications 204b, 204a categorize the virtual objects in the virtual environments 110a 110b, respectively, for use by the index map generators 504a, 504b. In some examples, the VR/AR applications 204b, 204a categorize the virtual objects using the same scheme as the example object categorizer 210 of FIG. 2. In some examples, the index map generators 504a, 504b use a mapped physical space 100 as generated by the example virtual to physical mappers 510b 510a. In this example, each index of the UVOLI matrix represents a location of the physical space 100 and the scalar value of each index represents the categorization of the virtual object at that location. Additionally, or alternatively, the value of each index may be a vector that contains additional data relating to the virtual object (e.g., velocity, momentum, size, application-specific data, etc.). In some examples, the location of the user (e.g., the user 104a and/or the user 104b.) is also included in the generated UVOLI. Additional detail in the function of the index map generators 504a, 504b is described in conjunction with FIG. 8. In some examples, one or both index map generators 504a, 504b are absent. For example, if the first index map generator 504a is absent, the UVOLI of the first virtual environment 110a is generated by the second index map generator 504b. In this example, the example first virtual environment 110a is transmitted to the second mobile device 504a from the first mobile device 502a.

The example collision detectors 506a, 506b compare the UVOLIs for different virtual environments (e.g., the virtual environments 110a, 110b) to determine the likelihood of collision between users (e.g., the users 104a 104b) experiencing those virtual environments. For example, the first collision detector 506a compares the UVOLI of the example first virtual environment 110a (e.g., generated by the first index map generator 504a) to the UVOLI of the second example virtual environment 110b (e.g., transmitted from the second mobile device 502b). Additionally or alternatively, the second collision detector 506b compares the UVOLI of the first virtual environment 110a (e.g., transmitted from the first mobile device 502a) to the UVOLI of the second virtual environment 110b (e.g., generated by the second index map generator 504b). In some examples, one of the first collision detector 506a or the second collision detector 506b is absent. For example, if the first collision detector 506a is absent, the collision likelihood can be calculated by the first collision detector 506a.

The object placers 508a, 508b place virtual objects in one or both of the virtual environments 110a 110b. For example, the objects placers 508a, 508b modify at least one of the UVOLIs associated with the example virtual environments 110a, 110b. In other examples, the first object placer 508a and the second object placer 508b directly interface with the first VR/AR application 204a and the second VR/AR application 204b, respectively to modify the first virtual environment 110a and the second virtual environment 110b, respectively. In some examples, one or both of the first object placers 508a, 508b are absent. For example, if the second object placer 508b is absent, the first object placer 508a may place objects in the second virtual environment 110b and/or modify the UVOLI associated with the example second virtual environment 110*b* such that the example second virtual environment 110*b* and/or the UVOLI associated the example second virtual environment 110*b* may be transmitted back to the second mobile device 502*b*. Alternatively, the first object placer 508*a* may only place objects in the first virtual environment 110*a* and/or modify the UVOLI associated with the first virtual environment 110*a*.

The example virtual to physical mappers 510*a*, 510*b* map the virtual environments 110*a*, 110*b* to the physical space 100. For example, the first virtual to physical mapper 510*a* may use GPS data from the mobile devices 502*a* to determine the location of the user 104*a*. In this example, since the physical location of the user 104*a* and the position of virtual objects in the virtual environment 110*a* relative to the user 104*a* are known, the corresponding physical locations of virtual objects may be determined by the first virtual to physical mapper 510*a*. In other examples, the virtual to physical mappers 510*a*, 510*b* may use environmental beacons to determine the location of the users 104*a*, 104*b*(e.g., using triangulation, trilateration, etc.). Alternatively, the virtual to physical mappers 510*a*, 510*b* may use any other suitable means for determining the corresponding physical locations of objects in the virtual environment 110*a* such as, Wi-Fi positioning, sensors in the physical space 100, sensors on the mobile devices 108*a*, RFID localization, etc. In some examples, when the second virtual to physical mapper 510*b* is absent, the first virtual to physical mapper 510*a* may use any suitable means to also determine the location of the second user 104*b* and/or determine the corresponding physical locations in the physical space 100 of virtual objects in the second virtual environment 110*b*. In some examples, the second virtual to physical mapper 510*a* may similarly determine the location of the first user 104*a*, the second user 104*b*, the corresponding physical locations in the physical space 100 of virtual objects in the first virtual environment 110*a* and/or the corresponding physical locations in the physical space 100 of virtual objects in the second virtual environment 110*b*.

While an example manner of implementing the system 500 is illustrated in FIG. 5, one or more of the elements, processes, and/or devices illustrated in FIG. 5 may be combined, divided, re-arranged, omitted, eliminated, and/or implemented in any other way. Further, the example VR/AR applications 204*a*, 204*b*, the example index map generators 504*a*, 504*b*, the example transceiver 202*a*, 202*b*, the example collision detectors 506*a*, 506*b*, the example object placer 508*a*, 508*b* and the virtual to physical mappers 510*a*, 510*b* the mobile devices 502*a*, 502*b* and/or, more generally, the system 500 of FIG. 5 may be implemented by hardware, software, firmware, and/or any combination of hardware, software, and/or firmware. Thus, for example, any of the example VR/AR applications 204*a*, 204*b*, the example index map generators 504*a*, 504*b*, the example transceiver 202*a*, 202*b*, the example collision detectors 506*a*, 506*b*, the example object placer 508*a*, 508*b* and the virtual to physical mappers 510*a*, 510*b* the mobile devices 502*a*, 502*b* and/or, more generally, the system 500 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, VR/AR applications 204*a*, 204*b*, the example index map generators 504*a*, 504*b*, the example transceiver 202*a*, 202*b*, the example collision detectors 506*a*, 506*b*, the example object placer 508*a*, 508*b* and the virtual to physical mappers 510*a*, 510*b* is/are hereby expressly defined to include a non-transitory computer readable storage device or storage disk such as a memory, a digital versatile disk (DVD), a compact disk (CD), a Blu-ray disk, etc., including the software and/or firmware. Further still, the example the system 500 may include one or more elements, processes, and/or devices in addition to, or instead of, those illustrated in FIG. 5, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
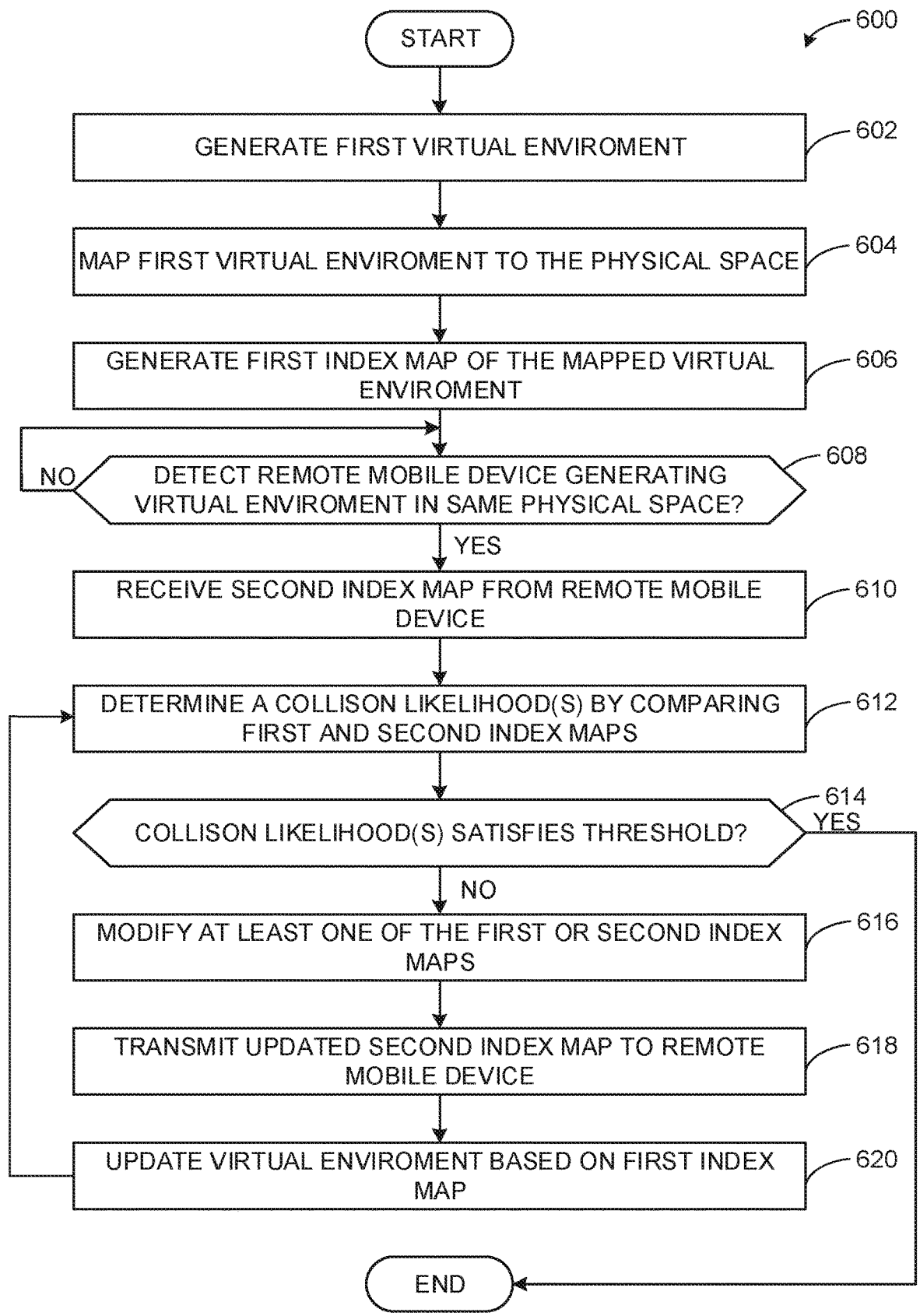
FIG. 6 is a flowchart representative of machine readable instructions which may be executed to implement the mobile device of FIG. 2.

A flowchart representative of example hardware logic or machine readable instructions for implementing the system 500 is shown in FIG. 6. The machine readable instructions may be a program or portion of a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIG. 5, many other methods of implementing the example s system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program 600 of FIG. 6 begins at block 602. In the illustrated example, the program 600 is implemented by the mobile device 502*a*. Additionally or alternatively, the program 600 may also be implemented by the mobile device 502*b*. At block 602, the first VR/AR application 204*a* generate the first virtual environment 110*a*. For example, the first VR/AR application may render a VR/AR application 204*a* and presented to it a user 104*a* using a headset (e.g., the first headset 106*a* of FIG. 1). Alternatively, the first virtual environment 110*a* may be presented to the user via the visual interface of the mobile device 502*a*. In some examples, the first VR/AR application 204*a* generates the first virtual environment 110*a* with virtual objects. In some examples, the VR/AR application 204*a* may classify the virtual objects in the first virtual environment 110*a* as attractive objects, repulsive objects and neutral objects. Once the first virtual environment 110*a* has been generated, the program 600 advances to block 604.

At block 604, the first virtual to physical mapper 510*a* maps the first virtual environment 110*a* to the physical space 100. For example, the first virtual to physical mapper 510*a* may use user location data (e.g., GPS data, environmental sensors, beacons, etc.) to overlay the first virtual environment 110a to the physical space 100. Alternatively, the first virtual to physical mapper 510a may use sensor data from the mobile device 502a and/or headset 106a. In other examples, the first virtual to physical mapper 510a may use any other suitable means to map the first virtual environment 110a to the physical space 100. Once the virtual environment 110a to the physical space 100, the program 600 advances to block 606.

At block 606, the first index map generator 504a generates an index map (e.g., a UVOLI) of the mapped first virtual environment 110a. For example, the first index map generator 504a generates a UVOLI which includes a matrix containing values indicating the categorization of each virtual environment. In other examples, the index map generator 504a generates an index map only indicating the location of objects in the first virtual environment 110a. Additionally or alternatively, the value(s) of each index of the generated index map may be a vector containing additional information about each virtual object (e.g., velocity, momentum, size, application-specific data, etc.). Once the first index map generator 504a has generated an index map, the program 600 advances to block 608.

At block 608, the first transceiver 202a determines if a remote mobile device (e.g., the second mobile device 502b) is generating a virtual environment (e.g., the second virtual environment 110b) in the physical space 100. For example, the first transceiver 202a may scan for a compatible remote device over a Wi-Fi network, a Bluetooth network, a near-field network or a cellular network (e.g., 4G, 5G, etc.). If a remote mobile device is not detected, the first transceiver 202a continues to scan for a remote mobile device (e.g., repeats block 608). If the first transceiver 202a does detect a remote mobile device, the program 600 advances to block 610.

At block 610, the first transceiver 202a receives a second index map from the remote mobile device. For example, the first transceiver 202a may establish a communication link so that the first transceiver 202a is able to receive an index map (e.g., a UVOLI) from the second mobile device 502b. In some examples, the communication link may be over Wi-Fi, a cellular network or any suitable means of transmitting data (e.g., near-field communication, Bluetooth, etc.). Alternatively, the first transceiver may instead receive information necessary to construct an index map for the virtual environment (e.g., the second mobile device 108b) generated on the remote mobile device. In this example, the first index map generator 504a then generates a second index map from the transmitted information on the second virtual environment 110b. Once the second index map has been received or generated, the program 600 advances to block 612.

At block 612, the first collision detector 506a determines a collision likelihood(s) by comparing the first and second index maps. For example, the collision detector 506a. For example, the first collision detector 506a may compare generated index maps (e.g., UVOLIs) to determine a likelihood of collision between users in each virtual environment 110a 110b. In some examples, the collision likelihood may be a single scalar value. Alternatively, the collision likelihood may be a value for each index of the UVOLIs. The program 600 advances to block 614.

At block 614, the first collision detector 506a determines if the calculated collision likelihood(s) satisfies threshold. For example, if the collision likelihood is a single scalar value, the first collision detector 506a may compare the determined the calculated collision likelihood to a threshold. Alternatively, if the collision likelihood(s) is a matrix of values, the collision detector 214 may determine if any value of the collision likelihood does not satisfies the threshold. In some example, the threshold corresponds to a maximum allowable safe collision threshold. If the collision likelihood(s) satisfies the threshold, the program 600 ends. If the collision likelihood(s) does not satisfies the threshold, the program 600 advances to block 616.

At block 616, the first object placer 508a modifies at least one of the first or second index maps. For example, the first object placer 508a may modify the first index map in such a way to reduce the likelihood(s) of collisions between the first user 104a and the second user 104b (e.g., placing a neutral object in a projected collision location 122 in index map, changing the momentum of a repulsive object, etc.). Additionally or alternatively, the first object placer 508a the first object placer may modify the second index map in such a way to reduce the likelihood of collision. The program 600 advances to block 618.

At block 618, the first transceiver 202a transmits updated second index map to remote mobile device (e.g., the second mobile device 502b). For example, if the object placer 508a modified the second index map, the first transceiver 202a transmits the modified index map to the remote mobile device (e.g., the second mobile device 502a via the second transceiver 202b). In some examples, if the object placer 508a did not modified the second index map, the first transceiver 202a may instead not transmit the second index map. The program 600 advances to block 620.

At block 620, the first VR/AR application 204a updates the virtual environment based on first index map. For example, if the object placer 508a modified the index by adding or removing objects to the first index map, the first VR/AR application 204a modifies the first virtual environment 110a to reflect the updated index map. In some examples, the VR/AR application 204a may instead modify the properties of an existing virtual object based on the index map. Once the virtual environment 110a has been amended, the program 600 returns to block 612.

Figure 7B:
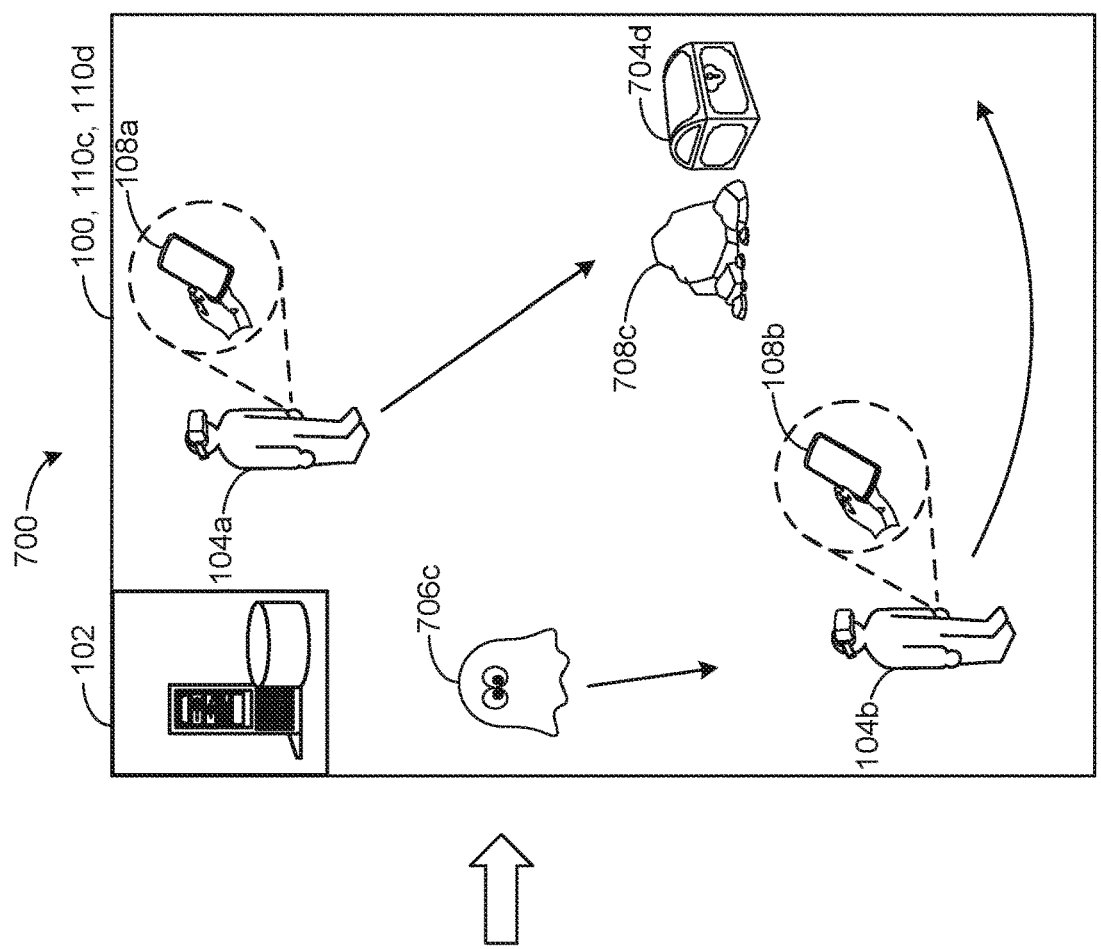
FIG. 7B is an illustration of the physical space of FIG. 7A with the two overlaid virtual environments after being modified according teachings disclosed herein.
Figure 7A:
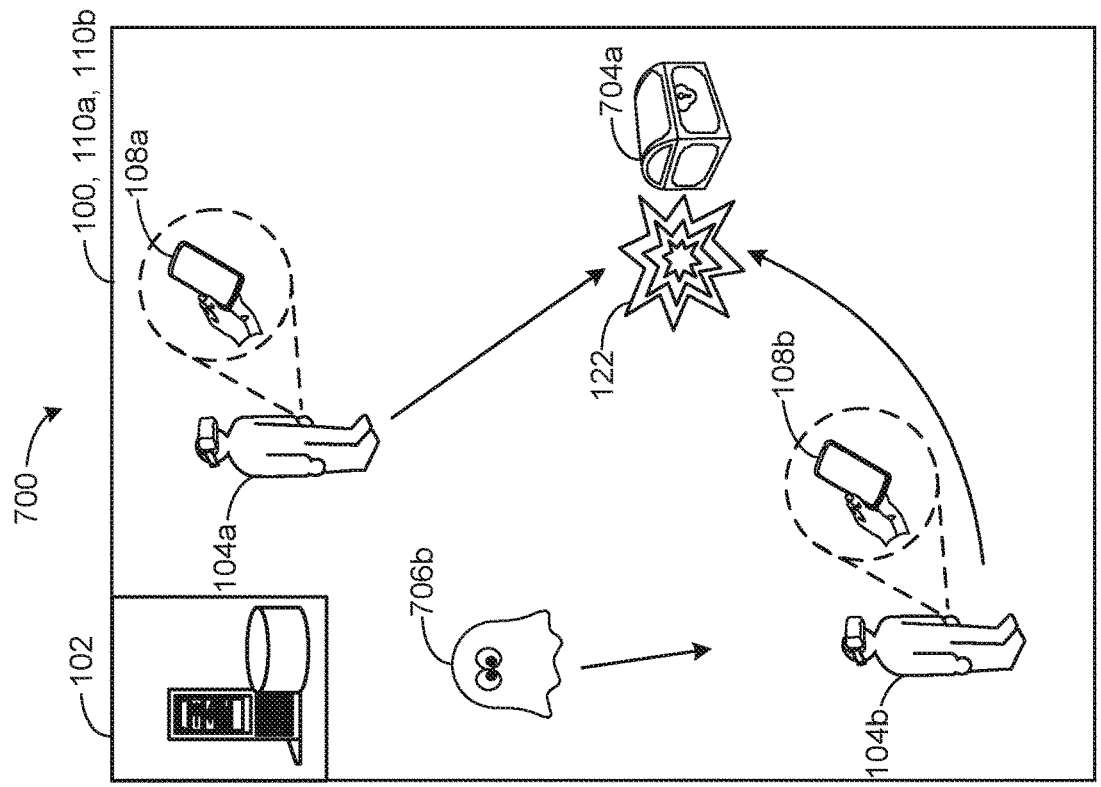
FIG. 7A is an illustration of an example physical space with two overlaid virtual environments before being modified according teachings disclosed herein.

FIG. 7A is an illustration of an example physical space 100 with two overlaid virtual environments before being modified according teachings disclosed herein. The first virtual environment 110a (e.g., the virtual environment generated by the mobile device 108a for the user 104a) includes an attractive object 704a. In the illustrated example, the attractive object 704a is a treasure chest. In other examples, the attractive object 704a may be a virtual object which may cause the user 104a to move towards the attractive object 704a (e.g., a friendly character, a powerup, etc.). The second virtual environment 110b (e.g., the virtual environment generated by the mobile device 108b for the user 104b) includes a repulsive object 706b. In the illustrated example, the repulsive object 706b is ghost move towards (e.g., chasing) the user 104b. In other examples, the repulsive object 706b may be any virtual object that causes the user 104b to move away from it (e.g., an enemy, a trap, etc.). In the illustrated example, the server 102 determines that a potential collision location 122 is likely to occur in front of the attractive object 704a (e.g., user the process 300 of FIG. 3). Additionally or alternatively, the first mobile device 108a and/or the second mobile device 108b may determine the potential collision location 122 is likely to occur in front of the attractive object 704a.

FIG. 7B is an illustration of the physical space of FIG. 7A with the two overlaid virtual environments 110c, 110d after being modified according teachings disclosed herein. The example modified virtual environments 110c, 110d may be generated by the process 300 of FIG. 3, program 600 of FIG.

6 and/or any other suitable means of modifying the first virtual environment 110a and the second virtual environment 110b, respectively, using the teachings disclosed herein. The modified virtual environment 110c, 110d are versions of the virtual environments 110a, 110b, respectively, that have been modified to reduce the likelihood of collision between the users 104a, 104b. In the illustrated example, the potential collision location 122 of FIG. 7A has been removed by placing an example neutral object 708c in the modified first virtual environment 110c. In the illustrated example, the neutral object 708c is a pile of rocks. In other examples, the neutral object 704c may instead by any suitable objects that deters the user 104b from occupying the same space as the neutral object 708c (e.g., a tree, a cactus, etc.). In the illustrated example, the user 104b sees the neutral object 708c and changes the direction of movement to avoid colliding with the neutral object 708c. In other examples, any combination of virtual objects may be added or removed from the virtual environments 110a, 110b to reduce the likelihood of collisions between users 104a, 104b.

Figure 8:
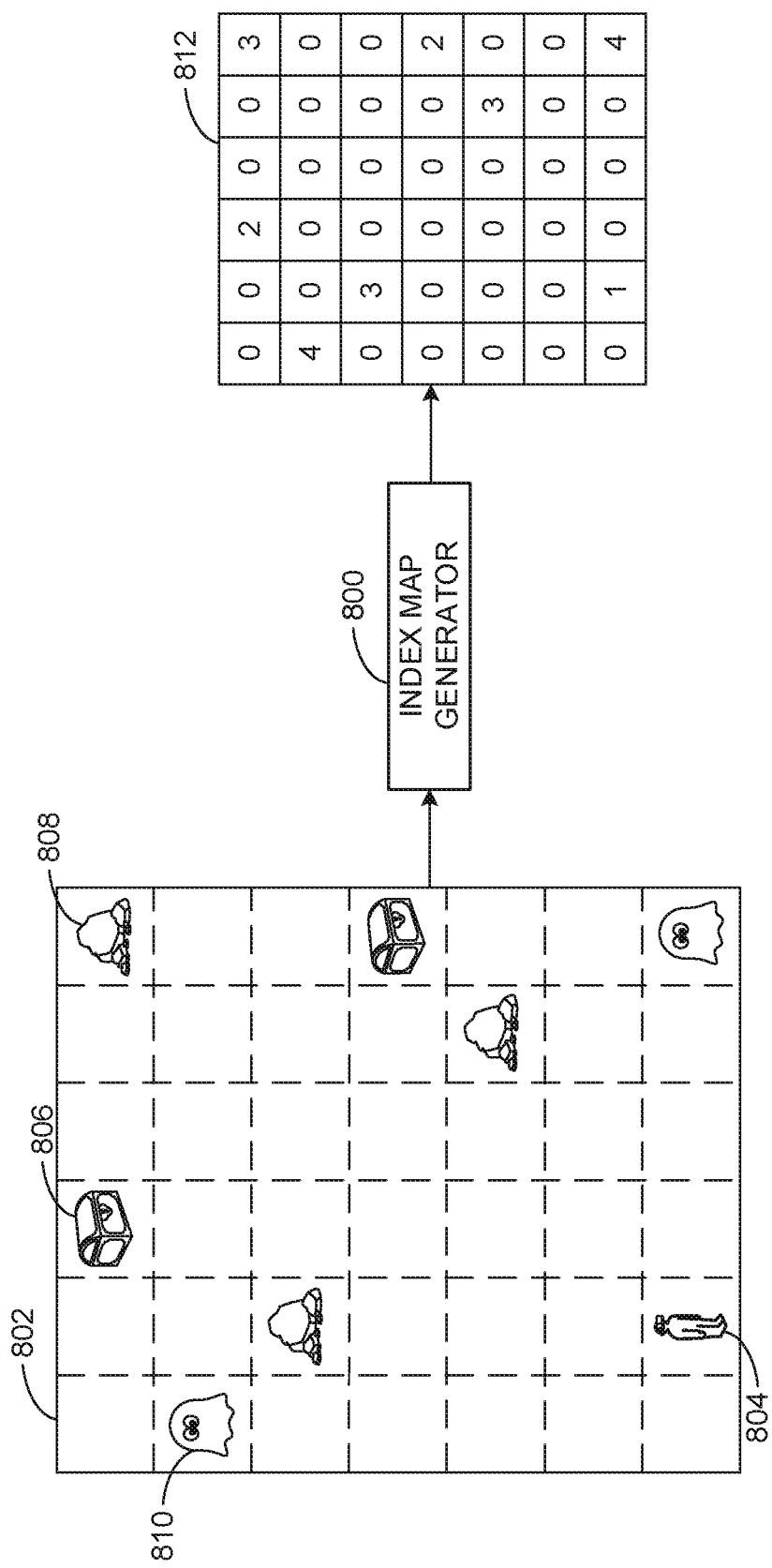
FIG. 8 illustrates an example operation of the index map generator of either FIG. 2 and/or FIG. 5.

FIG. 8 illustrates an example operation of the index map generator 800 (e.g., the index map generator 212 of FIG. 2 and/or the index map generators 504a, 504b FIG. 5) of either FIG. 2 and/or FIG. 5. ( ). In the illustrated example, the index map generator 800 receives an example virtual environment 802 and outputs an example index map 812. In the illustrated example, the example virtual environment 802 contains an example user 804 (e.g., the users 104a, 104b of FIG. 1), example attractive objects 806 (e.g., the attractive object 704a of FIG. 7), example neutral objects 808 (e.g., the neutral object 708c of FIG. 7) and example repulsive objects 810 (e.g., the repulsive object 706c of FIG. 7). In the illustrated example, the attractive objects 806, neutral objects 808, and the repulsive objects 810 have already been categorized (e.g., by the object categorizer 210)

In the illustrated example, the virtual space 802 has been divided into grid squares. The example virtual environment 802 has been mapped into a physical space (e.g., the physical space 100) such that each virtual grid location corresponds to a location in the physical space. In the illustrated example, adjacent locations in the virtual space 802 are adjacent in the physical location. In other examples, any other suitable method may be used to map the virtual space may be used. In some examples, virtual objects (e.g., the attractive objects 806, neutral objects 808, and the repulsive objects 810) can be associated with locations in the physical space by their location in the grid system. In some examples, if the virtual objects are larger than a grid square, the virtual objects may be in multiple grid locations.

The example index map generator 800 transforms the virtual space 802 in an index map 812 (e.g., a UVOLI). In the illustrated example, each grid space of the mapped virtual space 802 is associated with the corresponding index of the index map 812. In the illustrated example, each type of virtual object and the user are associated with a different value in the index map 812. For example, the user 804, attractive objects 806, neutral objects 808, and repulsive objects 810 are associated with "1," "2," "3," and "4," respectively, in the index map 812. Additionally or alternatively, each index of the index map 812 may contain other information about each corresponding grid in the virtual space 802, such as the momentum of the virtual object (e.g., if a repulsive object 810 is chasing a user 804).

Figure 9:
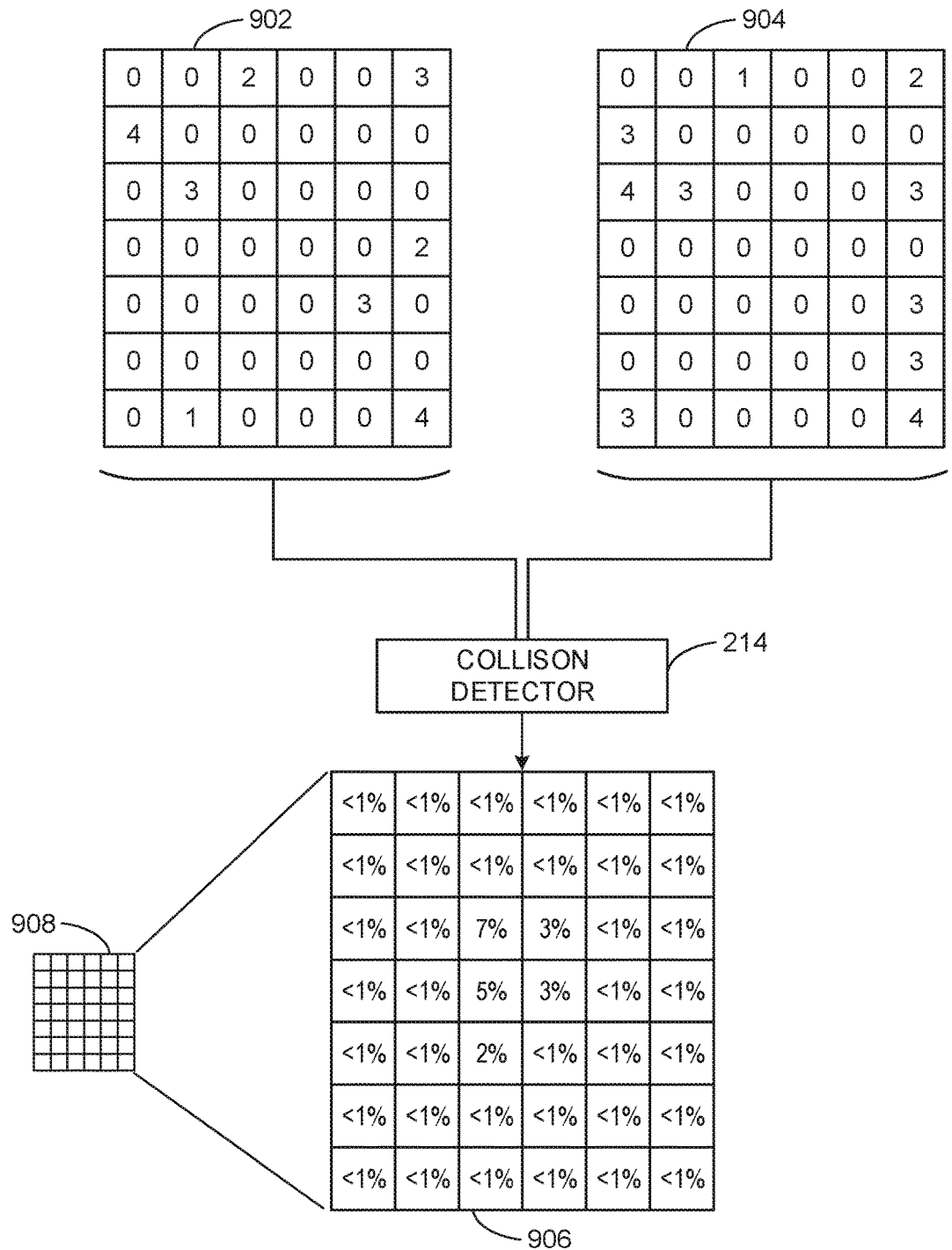
FIG. 9 illustrates an example operation of the collision detector of either FIG. 2 and/or FIG. 5.

FIG. 9 is an illustration of the operation of a collision detector 214 (e or, alternatively, the first collision detector 506a and/or the second collision detector 506b FIG. 5). The example collision detector 214 compares one or more index maps (e.g., an example first index map 902 and an example second index 904) and generates an example collision likelihood matrix 906. In the illustrated example, the collision detector compares the values in each index of the first index map 902 and the second index map 904 to generate the collision likelihood matrix 906. In some examples, the collision detector 900 may use machine learning techniques to generate the collision likelihood matrix 906. Additionally or alternatively, the collision detector 900 may use any suitable means to generate the collision likelihood matrix 906 (e.g., collision algorithms, etc.).

The example collision likelihood matrix 906 corresponds to a likelihood of collision between two or more users in each corresponding grid location of an example physical space 908 (e.g., the physical space 100 of FIG. 1) in the future (e.g., the next 30 seconds). In other examples, the collision likelihood matrix 906 may represent the collision likelihood in any suitable time frame (e.g., the next five seconds, the next minute, until the end of a round of a game, etc.). For example, after comparing the first index map 902 and the second index map 904, the collision detector 214 determines the upper right grid location has a collision likelihood of less than 1% and the grid in the third row of the third column has a 5% chance of collision. In other examples, the collision likelihood matrix 906 is a single value representing the total likelihood of collision in the entire physical space 908. In other examples, the collision detector 214 instead assigns one or more collision likelihood to each person (e.g., each user) in the physical space 908.

Figure 10:
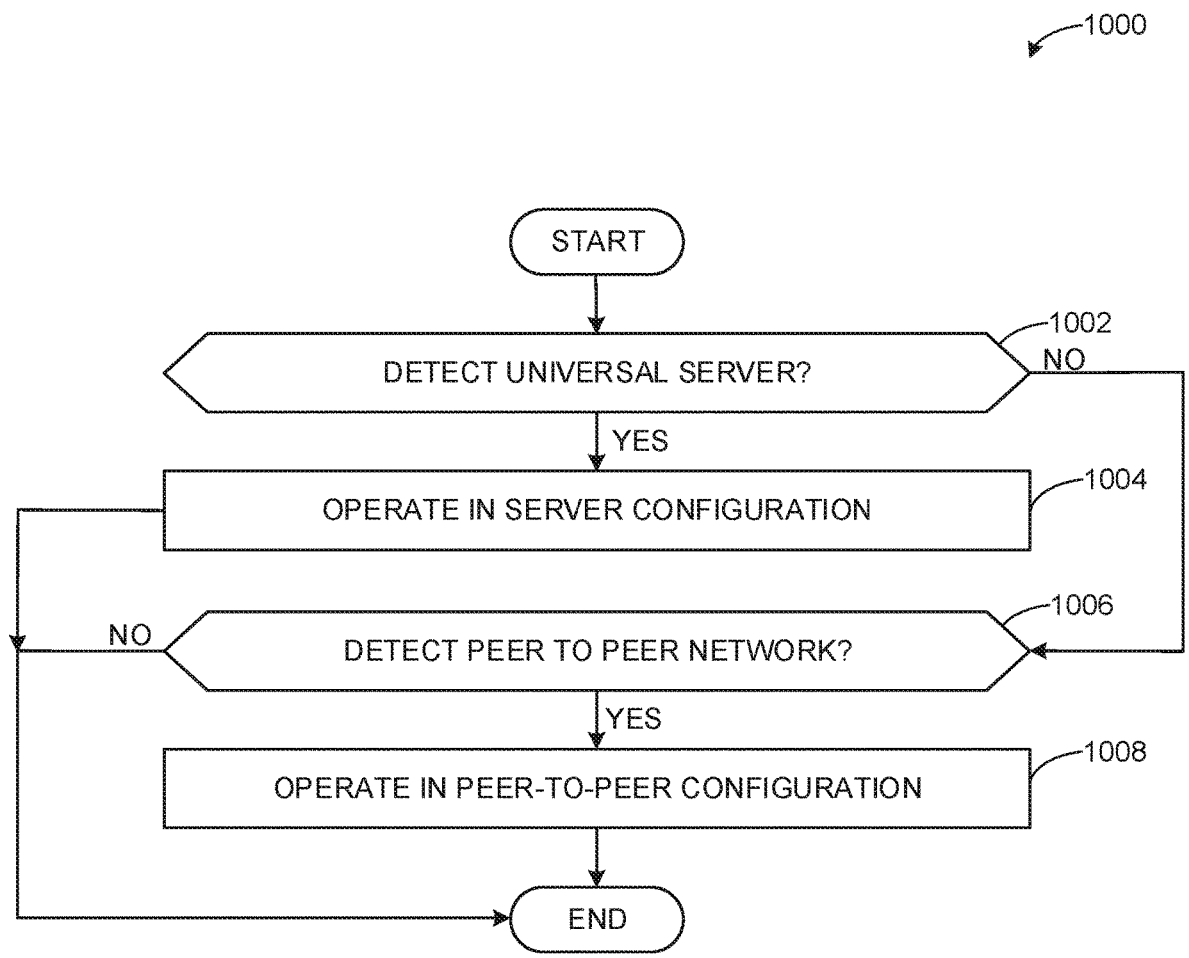
FIG. 10 is a flowchart representative of machine readable instructions which may be executed to determine if a mobile device is to operate in server-mode or peer-to-peer mode.

A flowchart representative of example hardware logic or machine readable instructions for implementing the first mobile device 502a of FIG. 5 of FIG. 5 is shown in FIG. 10. The machine readable instructions may be a program or portion of a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIG. 5, many other methods of implementing the example first mobile device 508a may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 10 is a flowchart representative of machine readable instructions of example process 1000 which may be executed to determine if a mobile device (e.g., the first mobile device 502a of FIG. 5) is to operate in server-mode or peer-to-peer mode. In the illustrated example, an example process 1000 is described with reference to first mobile device 502a of FIG. 5. However, in other examples, the process 1000 may also be executed by the second mobile device 502b of FIG. 5, the first mobile device 108a of FIG. 1 and/or the second mobile device 108b of FIG. 1.

At block 1002, the first transceiver 202a detects if a universal server (e.g., the server 102 of FIG. 1) is present. For example, the first transceiver 202a may scan for the server 102 capable of executing the process 300 of FIG. 3. If a universal server is detected, the process 1000 advances to 1004. If a universal server is not detected, the process 1000 advances to block 1008. At block 1004, the mobile device 502a operates in the server configuration. For example, the mobile device 502a and the server 102 may execute the processes 300, 400 of FIGS. 3 and 4. In other examples, any other suitable means of using the server 102 for collision avoidance implemented using the teachings of this disclosure may be used. Then the process 1000 ends.

At block 1006, the first transceiver 202a detects if a peer-to-peer network (e.g., another mobile device capable of executing the methods disclosed herein). For example, the first transceiver 202a can for another compatible mobile device. If a peer-to-peer network is detected, the process 1000 advance to block 1010. If a peer-to-peer network is not detected, the process 1000 ends. At block 1010, the mobile device 502a operates in the peer-to-peer configuration. For example, the mobile device 502a may execute the program 600 of FIG. 6. In other examples, any other suitable means of using the mobile device 502a for collision avoidance implemented using the teachings of this disclosure may be used. Then the process 1000 ends.

As mentioned above, the example processes of FIGS. 3, 4, 6 and 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 11:
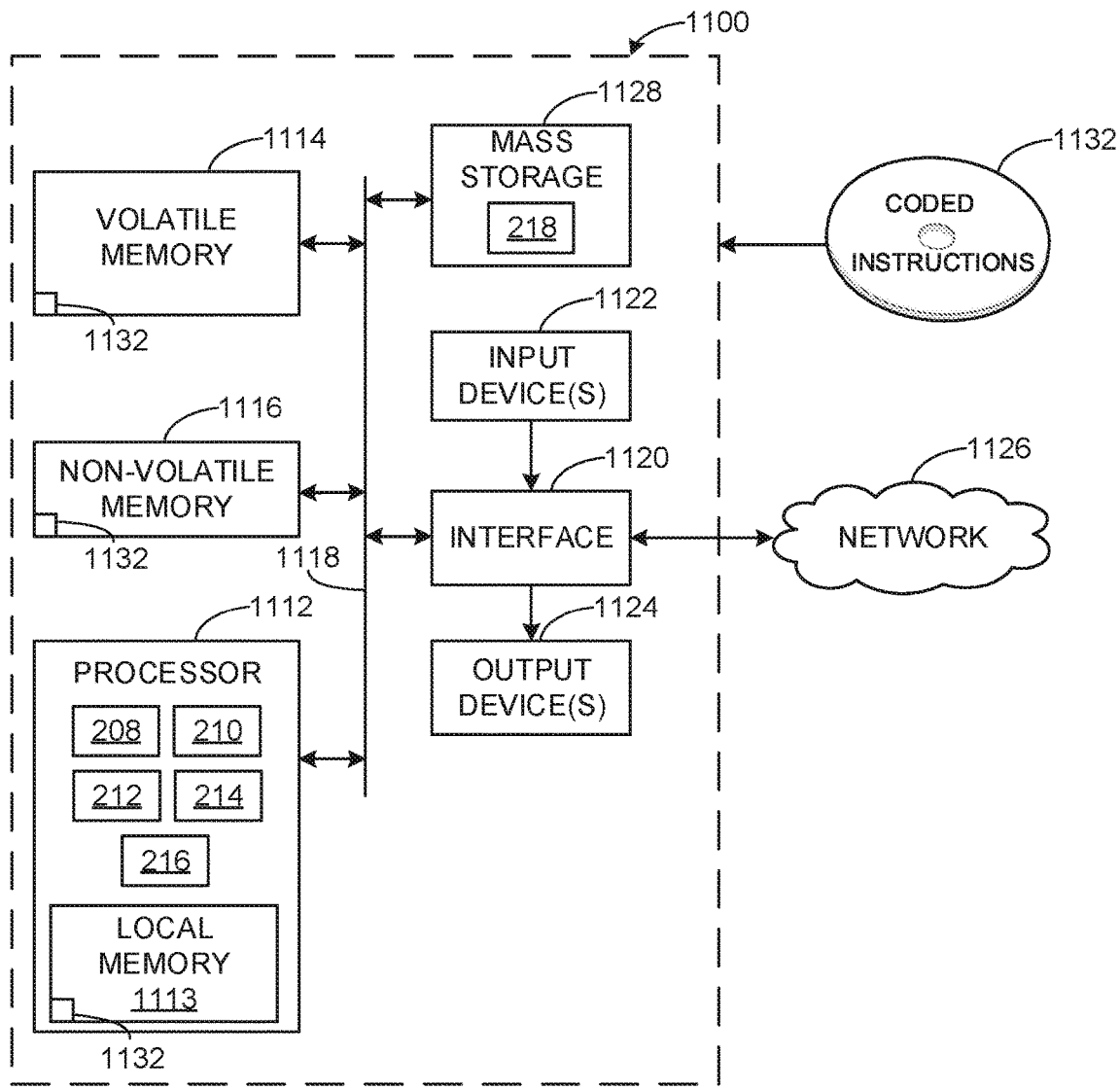
FIG. 11 is a block diagram of an example processing platform structured to execute the instructions of FIGS. 3 and/or 4 to implement the server of FIG. 2.

FIG. 11 is a block diagram of an example processor platform 1100 structured to execute the instructions of FIG. 3 to implement the server 102 of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example environment scanner 208, the example object categorizer 210, the example index map generator 212, the example collision detector 214, the example object placer 216 and the example object database 218.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 3 may be stored in the mass storage device 1128, in the volatile memory 1114, in the non-volatile memory 1116, and/or on a removable non-transitory computer readable storage medium such as a CD or DVD.

Figure 12:
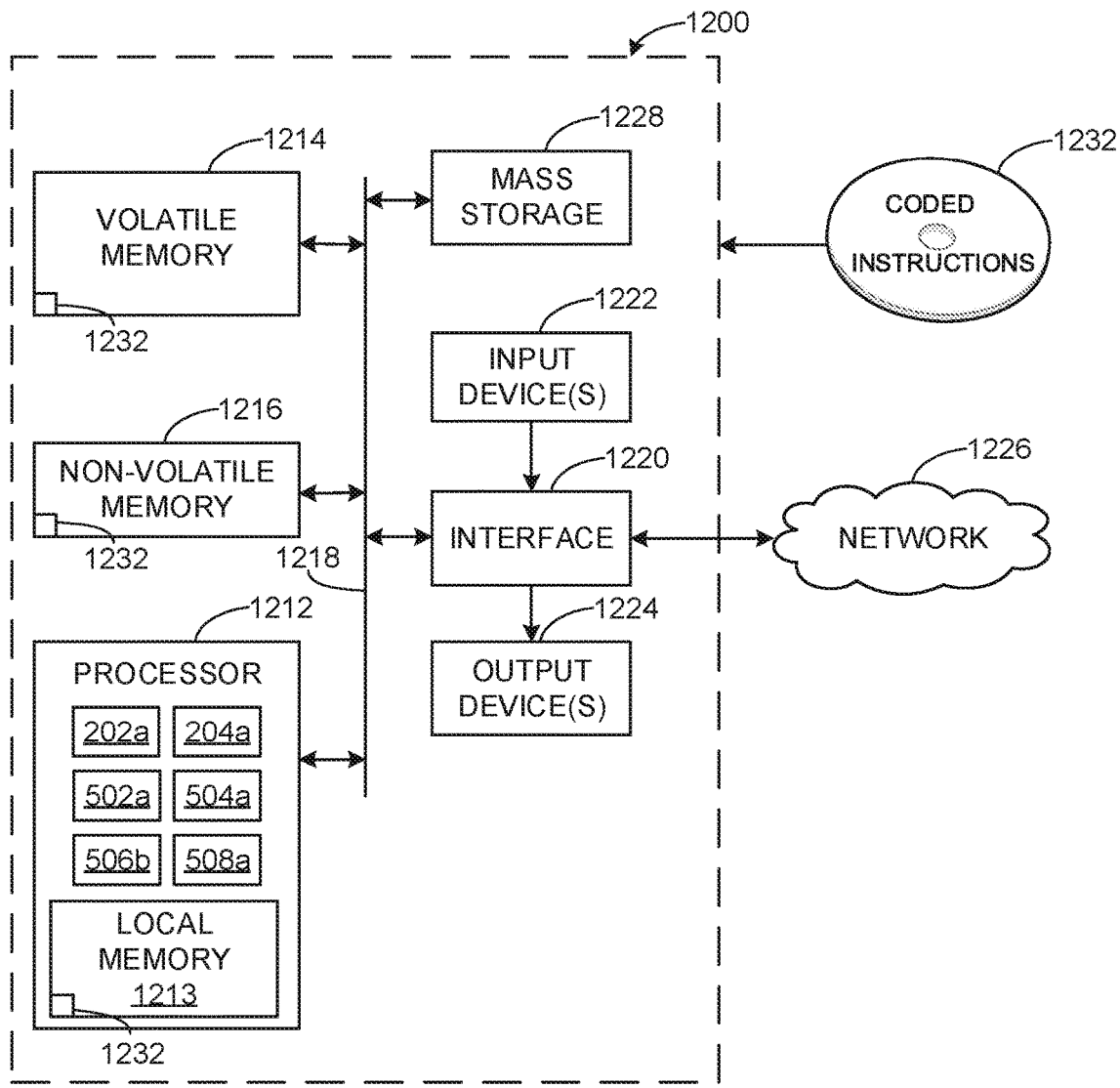
FIG. 12 is a block diagram of an example processing platform structured to execute the instructions of FIG. 3 to implement the mobile device of FIG. 5.

FIG. 12 is a block diagram of an example processor platform 1200 structured to execute the instructions of FIGS. 6 and/or 10 to implement the first mobile device 502a of FIG. 5. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the first VR/AR application 204a, the first index map generator 504a, the first transceiver 202a, the first collision detector 506a, the first object placer 508a and the first virtual to physical mapper 510a.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 6 and 10 may be stored in the mass storage device 1228, in the volatile memory 1214, in the non-volatile memory 1216, and/or on a removable non-transitory computer readable storage medium such as a CD or DVD.

The following paragraphs provide various examples of examples disclosed herein.

Example 1 includes a system for avoiding collision for virtual environment in a shared physical space, the system comprising a first mobile device associated with a first user, a first mobile device generating a first virtual environment, a second mobile device, associated with a second user, the second mobile device generating a second virtual environment, and a server including an index map generator to generate a first index map and a second index map from the first virtual environment and the second virtual environment, respectively, a collision detector to determine a collision likelihood based on a comparison of the first index map and the second index map, and an object placer to, in response to the collision likelihood satisfying a threshold, modify at least one of the first virtual environment or the second virtual environment.

Example 2 includes the system of example 1, wherein the server also includes a transceiver to communicate with the first and second mobile devices.

Example 3 includes the system of example 1, wherein the modifying at least one of the first virtual environment or the second virtual environment reduces the collision likelihood.

Example 4 includes the system of example 3, wherein the server further includes an environmental scanner to identify each virtual object in the first virtual environment and the second virtual environment, and an object categorizer to categorize each virtual object in the first virtual environment and the second virtual environment as a repulsive object, a neutral object or an attractive object.

Example 5 includes the system of example 4, wherein reducing the collision likelihood includes at least one of (1) placing a repulsive object, (2) placing a neutral object or (3) placing an attractive object.

Example 6 includes the system of example 4, wherein reducing the collision likelihood includes at least one of (1) removing a repulsive object, (2) removing a neutral object or (3) removing an attractive object.

Example 7 includes the system of example 4, wherein the object categorizer communicates with an object database, the object database containing a classification of each object in the first virtual environment and the second virtual environment.

Example 8 includes the system of example 1, wherein the first index map includes a first matrix, the first matrix indicating corresponding locations in the shared physical space of a first set of virtual objects in the first virtual environment, and the second index map includes a second matrix, the second matrix indicating corresponding locations in the shared physical space of a second set of virtual objects in the second virtual environment.

Example 9 includes the system of example 8, wherein the first set of virtual objects is unique to the first virtual environment and the second set of virtual objects is unique to the second virtual environment, the second virtual environment different from the first virtual environment.

Example 10 includes an apparatus, comprising an index map generator to generate a first index map based a first virtual environment generated by a first mobile device, the first mobile device associated with a first user, and generate a second index map based on a second virtual environment generated by a second mobile device, the second mobile device associated with a second user in a shared physical space with the first user, a collision detector to determine a collision likelihood based on a comparison of the first index map and the second index map, and an object placer to, in response to the collision likelihood satisfying a threshold, modify at least one of the first virtual environment or the second virtual environment.

Example 11 includes the apparatus of example 10, further including an environmental scanner to identify each virtual object in the first virtual environment and the second virtual environment.

Example 12 includes the apparatus of example 11, wherein the environment scanner is further to determine a corresponding physical location in the shared physical space of a first set of virtual objects, the first set of virtual objects associated with the first virtual environment, and determine a corresponding physical location in the shared physical space of a second set of virtual objects, the second set of virtual objects associated with the second virtual environment.

Example 13 includes the apparatus of example 12, wherein the first index map includes a first matrix, the first matrix indicating the corresponding locations in the shared physical space of the first set of virtual objects, and the second index map includes a second matrix, the second matrix indicating the corresponding locations in the shared physical space of the second set of virtual objects.

Example 14 includes the apparatus of example 11, further including an object categorizer to categorize each object in the first virtual environment and the second virtual environment as a repulsive object, a neutral object or an attractive object.

Example 15 includes the apparatus of example 10, wherein the modifying at least one of the first virtual environment or the second virtual environment reduces the collision likelihood.

Example 16 includes the apparatus of example 15, wherein reducing the collision likelihood includes at least one of (1) placing a first virtual object, (2) removing a second virtual object or (3) moving a third virtual object.

Example 17 includes a method for avoiding collision for virtual environment in a shared physical space, the method comprising generating a first index map based a first virtual environment generated by a first mobile device, the first mobile device associated with a first user in a physical space, generating a second index map based on a second virtual environment generated by a second mobile device, the second mobile device associated with a second user in the physical space, determining a collision likelihood based on a comparison of the first index map and the second index map, and in response to the collision likelihood satisfying a threshold, modifying at least one of the first virtual environment or the second virtual environment.

Example 18 includes the method of example 17, further including identifying each virtual object in the first virtual environment and the second virtual environment, and categorizing each virtual object in the first virtual environment and the second virtual environment.

Example 19 includes the method of example 18, wherein the modifying at least one of the first virtual environment or the second virtual environment reduces the collision likelihood.

Example 20 includes the method of example 19, wherein reducing the collision likelihood includes at least one of (1) placing a first virtual object, (2) removing a second virtual object or (3) moving a third virtual object.

Example 21 includes a non-transitory computer readable medium comprising instructions that, when executed, cause at least one processor to at least generate a first index map based a first virtual environment generated by a first mobile device, the first mobile device associated with a first user, generate a second index map based on a second virtual environment generated by a second mobile device, the second mobile device associated with a second user in a shared physical space with the first user, determine a collision likelihood based on a comparison of the first index map and the second index map, and in response to the collision likelihood satisfying a threshold, modify at least one of the first virtual environment or the second virtual environment.

Example 22 includes the non-transitory computer readable medium of example 21, further including instructions that when executed, cause at least one processor to at least identify each virtual object in the first virtual environment and the second virtual environment, and categorize each virtual object in the first virtual environment and the second virtual environment.

Example 23 includes the non-transitory computer readable medium of example 21, wherein the modification of at least one of the first virtual environment or the second virtual environment reduces the collision likelihood.

Example 24 includes the non-transitory computer readable medium of example 23, wherein reducing the collision likelihood includes at least one of (1) placing a first virtual object, (2) removing a second virtual object or (3) moving a third virtual object.

Example 25 includes the non-transitory computer readable medium of example 21, wherein the first index map includes a first matrix, the first matrix indicating corresponding locations in the shared physical space of a first set of virtual objects in the first virtual environment, and the second index map includes a second matrix, the second matrix indicating corresponding locations in the shared physical space of a second set of virtual objects in the second virtual environment.

Example 26 includes an apparatus for avoiding collision for virtual environment in a shared physical space, the method comprising means for generating a first index map based a first virtual environment generated by a first mobile device, the first mobile device associated with a first user in a physical space, means for generating a second index map based on a second virtual environment generated by a second mobile device, the second mobile device associated with a second user in the physical space, means for determining a collision likelihood based on a comparison of the first index map and the second index map, and means for modifying, in response to the collision likelihood satisfying a threshold, at least one of the first virtual environment or the second virtual environment.

Example 27 includes the apparatus of example 26, further including means for identifying each virtual object in the first virtual environment and the second virtual environment, and means for categorizing each virtual object in the first virtual environment and the second virtual environment.

From the foregoing, it will be appreciated that example methods, apparatus and articles of manufacture have been disclosed that improve the interactions of users of AR and VR technology in shared physical spaces. Examples disclosed herein modify virtual environments to reduce the likelihood of physical injury to users and damage to AR and VR equipment. For example, attractive or repulsive objects may be added to environments to encourage users to occupy different areas of a shared environment (e.g., a first user moves to a first area and a second user moves to a second area wherein the first area and the second area are separated by a threshold distance).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   an index map generator to generate a first index map based on a first virtual environment generated by a first mobile device, the first mobile device associated with a first user;
   a collision detector to determine a collision likelihood based on the first index map; and
   an object placer to, in response to the collision likelihood satisfying a threshold, modify the first virtual environment.

2. The apparatus of claim 1, wherein the index map generator is further to generate a second index map based on a second virtual environment generated by a second mobile device, the second mobile device associated with a second user in a shared physical space with the first user.

3. The apparatus of claim 2, wherein the collision detector determines the collision likelihood based on a comparison of the first virtual environment and the second virtual environment.

4. The apparatus of claim 1, further including an environmental scanner to identify a virtual object in the first virtual environment.

5. The apparatus of claim 4, wherein the environmental scanner is further to determine a corresponding physical location of the virtual object in a physical space associated with the first user, the first index map including a matrix, the matrix indicating the corresponding physical location in the physical space of the virtual object.

6. The apparatus of claim 4, further including an object categorizer to categorize the virtual object as a repulsive object, a neutral object or an attractive object, the collision likelihood further based on the categorization of the virtual object.

7. The apparatus of claim 1, wherein the object placer modifies the first virtual environment to reduce the collision likelihood by at least one of (1) placing a first virtual object, (2) removing a second virtual object or (3) moving a third virtual object.

8. A method, comprising:
   generating a first index map based on a first virtual environment generated by a first mobile device, the first mobile device associated with a first user;
   determining a collision likelihood based on the first index map; and
   in response to the collision likelihood satisfying a threshold, modifying the first virtual environment.

9. The method of claim 8, further including generating a second index map based on a second virtual environment generated by a second mobile device, the second mobile device associated with a second user in a shared physical space with the first user.

10. The method of claim 9, wherein the determination of the collision likelihood is based on a comparison of the first virtual environment and the second virtual environment.

11. The method of claim 8, further including identifying a virtual object in the first virtual environment.

12. The method of claim 11, further including determining a corresponding physical location of the virtual object in a physical space associated with the first user, the first index map including a matrix, the matrix indicating the corresponding physical location in the physical space of the virtual object.

13. The method of claim 8, wherein the modification of the first virtual environment reduces the collision likelihood and includes at least one of (1) placing a first virtual object, (2) removing a second virtual object or (3) moving a third virtual object.

14. A non-transitory computer readable medium comprising instructions that, when executed, cause a processor to at least:
   generate a first index map based on a first virtual environment generated by a first mobile device, the first mobile device associated with a first user;
   determine a collision likelihood based on the first index map; and
   in response to the collision likelihood satisfying a threshold, modify the first virtual environment.

15. The non-transitory computer readable medium of claim 14, wherein the instructions further cause the processor to generate a second index map based on a second virtual environment generated by a second mobile device, the second mobile device associated with a second user in a shared physical space with the first user.

16. The non-transitory computer readable medium of claim 15, wherein determination of the collision likelihood is based on a comparison of the first virtual environment and the second virtual environment.

17. The non-transitory computer readable medium of claim 14, wherein the instructions further cause the processor to identify a virtual object in the first virtual environment.

18. The non-transitory computer readable medium of claim 17, wherein the instructions further cause the processor to determine a corresponding physical location of the virtual object in a physical space associated with the first user, the first index map including a matrix, the matrix indicating the corresponding physical location in the physical space of the virtual object.

19. The non-transitory computer readable medium of claim 17, wherein the instructions further cause the processor to categorize the virtual object as a repulsive object, a neutral object or an attractive object, the collision likelihood further based on the categorization of the virtual object.

20. The non-transitory computer readable medium of claim 14, wherein the instructions further cause the processor to reduce the collision likelihood by at least one of (1)

placing a first virtual object, (2) removing a second virtual object or (3) moving a third virtual object.

21. An apparatus, comprising:
at least one memory;
instructions in the apparatus; and
processor circuitry to execute the instructions to:
generate a first index map based on a first virtual environment generated by a first mobile device, the first mobile device associated with a first user;
determine a collision likelihood based on the first index map; and
in response to the collision likelihood satisfying a threshold, modify the first virtual environment.

22. The apparatus of claim 21, wherein processor circuitry is to execute the instructions to generate a second index map based on a second virtual environment generated by a second mobile device, the second mobile device associated with a second user in a shared physical space with the first user.

23. The apparatus of claim 22, wherein processor circuitry is to execute the instructions to determine the collision likelihood based on a comparison of the first virtual environment and the second virtual environment.

24. The apparatus of claim 21, wherein processor circuitry is to execute the instructions to identify a virtual object in the first virtual environment.

25. The apparatus of claim 24, wherein processor circuitry is to execute the instructions to determine a corresponding physical location of the virtual object in a physical space associated with the first user, the first index map including a matrix, the matrix indicating the corresponding physical location in the physical space of the virtual object.

26. The apparatus of claim 24, wherein processor circuitry is to execute the instructions to categorize the virtual object as a repulsive object, a neutral object or an attractive object, the collision likelihood further based on the categorization of the virtual object.

27. The apparatus of claim 21, wherein processor circuitry is to execute the instructions to modify the first virtual environment to reduce the collision likelihood by at least one of (1) placing a first virtual object, (2) removing a second virtual object or (3) moving a third virtual object.

* * * * *